US006420063B1

(12) United States Patent
Ozin et al.

(10) Patent No.: US 6,420,063 B1
(45) Date of Patent: Jul. 16, 2002

(54) MESOPOROUS OXIDE COMPOSITIONS AND SOLID OXIDE FUEL CELLS

(75) Inventors: Geoffrey A. Ozin, Toronto (CA); Marc Mamak, Lancaster, NY (US); Neil A. Coombs, Toronto (CA)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/496,386

(22) Filed: Feb. 2, 2000

Related U.S. Application Data

(60) Provisional application No. 60/153,502, filed on Sep. 13, 1999.

(51) Int. Cl.[7] .................................................. H01M 4/90
(52) U.S. Cl. ...................................................... 429/40
(58) Field of Search ........................... 429/31, 32, 40, 429/218.1; 29/623.1; 428/702

(56) References Cited

U.S. PATENT DOCUMENTS

| | | | | |
|---|---|---|---|---|
| 4,883,497 A | * | 11/1989 | Clear ........................ 29/623.5 |
| 4,971,830 A | * | 11/1990 | Jensen ........................ 427/34 |
| 5,035,962 A | * | 7/1991 | Jensen ........................ 429/40 |
| 5,106,706 A | * | 4/1992 | Singh ........................ 429/31 |
| 5,785,946 A | | 7/1998 | Pinnavaia et al. ........... 423/502 |
| 5,786,294 A | | 7/1998 | Sachtler et al. |
| 5,908,713 A | * | 6/1999 | Ruka ........................ 429/31 |
| 6,232,004 B1 | * | 5/2001 | Lasater ........................ 428/702 |
| 6,248,468 B1 | * | 6/2001 | Ruka ........................ 429/40 |

FOREIGN PATENT DOCUMENTS

| JP | 405234600 A | * 9/1993 | ............ H01M/4/88 |
|---|---|---|---|
| WO | WO 99/65822 | 12/1999 | |

* cited by examiner

*Primary Examiner*—Gabrielle Brouillette
*Assistant Examiner*—Mark Ruthkosky
(74) *Attorney, Agent, or Firm*—Ronald D. Hantman

(57) ABSTRACT

The invention discloses methods of producing thermally stable mesoporous transition metal oxide compositions by aqueous co-assembly of glycometallates and metal complexes with a surfactant template, without the necessity of the use of stabilizers. Mesoporous (nickel/platinum)-yttria-zirconia materials are also disclosed for use as electrode materials in solid oxide fuel cells. These materials display the highest surface area of any form of (metal)-yttria-stabilized-zirconia, thereby providing significant improvement in the efficiency of solid oxide fuel cells.

8 Claims, 13 Drawing Sheets

MESOPOROUS OXIDE COMPOSITIONS AND SOLID OXIDE FUEL CELLS

CROSS-REFERENCE TO RELATED APPLICATIONS

This application claims priority to U.S. Provisional Application Serial No. 60/153,502 filed on Sep. 13, 1999.

BACKGROUND OF INVENTION

The invention relates to a new class of mesoporous (nickel/platinum)-yttria-zirconia materials, denoted meso-(Ni/Pt)YZ, which have utility as electrode materials in solid oxide fuel cells (SOFCs). They are synthesized by aqueous co-assembly of glycometallates and metal complexes with a surfactant template.

The solid-oxide fuel cell (SOFC) has been a leading candidate for both stationary and mobile power generation for the past 10 years. This is due to its all solid-state configuration, which eliminates moving parts and corrosive liquids, a high energy conversion efficiency not subject to the Carnot cycle, low emission of pollutants, and multi-fuel capability. SOFCs operate at elevated temperatures (600–1000° C.) allowing them to process a multitude of fuels including methane and methanol, a key point considering the world is not yet on a hydrogen economy.

While SOFCs offer great potential as an alternative energy source, this technology has yet to become commercially viable mainly due to the nature of its active components, the anode and cathode. Since the inception of SOFCs, the electrodes have remained of the same basic form consisting, at least in part, as a dense ceramic phase. The anode has traditionally been a nickel/yttria-stabilized-zirconia (YSZ) cermet while the cathode material is usually a perovskite of the composition $La_xSr_{1-x}MnO_3$ or a platinum/YSZ composite. Electrodes have stringent requirements for use within a SOFC due to the high operating temperatures involved. These include stability in terms of chemical reactivity, phase, morphology, dimensionality, thermal expansion coefficient, catalytic activity, electronic and ionic conductivity and porosity. Existing electrode materials are intrinsically dense having zero intra-granular porosity at elevated temperatures and exhibiting low surface areas arising from inter-granular necking produced through sintering processes. Porosity is a singular attribute, which not only controls the transport of gaseous fuel/oxidant to reactive sites, but also the length of the triple-phase-boundary (TPB) where charge transfer occurs for an electronically/ionically conducting electrode. The TPB is defined as the interface where the electronically/ionically conductive electrode meets both the YSZ electrolyte and the gaseous fuel/oxidant. Both mass transport (gaseous diffusion, adsorption processes and surface diffusion) and charge transfer processes at the TPB limit the efficiency of SOFCs.

Several researchers have attempted to improve porosity and enlarge the TPB by manipulating the electrode microstructure through traditional solid state chemistry and material science techniques, which includes but is not limited to, the impregnation of YSZ with noble metal salts and chemical deposition of electrode materials on YSZ substrates. The common thread among these approaches involves enlarging the TPB by diminishing the dimensions of metal particles such as Ni, Pt, in relation to YSZ grains. In essence, these materials are nanoscale or microscale versions of the bulk cermet electrode materials having a comparatively wide pore size distribution with low thermal stability The synthesis of mesoporous materials through surfactant-based self-assembly techniques has been an area of intense research since 1992; however, there are no adaptations of the technique that produce mesoporous yttria-zirconia analogues which are sufficiently thermally stable to function as SOFC materials. Most mesoporous transition metal oxide materials reported as being stable upon surfactant removal incorporate either phosphate or sulfate groups as stabilizers and should be regarded as oxo-sulfates or oxo-phosphates (Ying et al. U.S. Pat. No. 5,958,367). Further, these materials structurally collapse when these groups are removed upon heating to around 400° C. Moreover, mesoporous yttria-zirconia versions have not been reported.

Accordingly, it is one of the purposes of this invention, among others, to produce SOFC electrode materials in which glycometallates and metal complexes are co-assembled with a surfactant template to produce a binary or ternary mesoporous-(metal)-yttria-stabilized-zirconia, meso-(M)YZ, which has uniform sized walls, high thermal stability (800° C.) and electroactive catalytic sites, and high ionic/electronic conductivity.

SUMMARY OF THE INVENTION

The present invention is a method of producing a thermally stable mesoporous transition metal oxide composition. The method includes reacting a transition metal polyol-based gel with a surfactant in an aqueous environment under basic conditions. The transition metal polyol-based gel can be produced by dissolving a source of a transition metal in a polyol-based solvent with a high dielectric constant and coordinating ability to form a first solution; dissolving a source of a second metal in a second polyol-based solvent with a high dielectric constant and coordinating ability to form a second solution; and mixing these solutions to form the transition metal polyol-based gel.

The transition metals used in this invention to form the transition metal polyol-based gel can be any of the transition metals. A preferred source of the transition metal can be any transition metal alkoxide, transition metal glycolate or transition metal acetate. Preferred transition metal alkoxides are zirconium alkoxide, yttrium alkoxide, scandium alkoxide or rare earth alkoxides. The most preferred source of a transition metal alkoxide is zirconium ethoxide.

The second metal used in this invention to form the transition metal polyol-based gel can be any metal. A preferred source of the second metal can be any metal alkoxide, metal glycolate or metal acetate. Preferred metal alkoxides are yttrium alkoxide, scandium alkoxide, rare earth alkoxides, calcium alkoxide and magnesium alkoxide. The most preferred source of the second metal is yttrium acetate. Preferably, the resulting mesoporous transition metal oxide composition includes from about 1 to about 60 atomic % yttrium.

The polyol-based solvent is preferably ethylene glycol. The surfactant is preferably a neutral or cationic surfactant. The cationic surfactant can be a long-chain alkyl substituted ammonium salt. The preferred long-chain alkyl substituted ammonium salt is cetyltrimethyl ammonium bromide.

In one embodiment, the method can further include the addition of a metal precursor to the transition metal polyol-based gel. This would result in the formation of a mesoporous ternary transition metal oxide composition. The metal precursor can be a platinum precursor, a nickel precursor, a palladium precursor, a copper precursor, an iron precursor, a ruthenium precursor, a rhodium precursor or a cobalt precursor.

The method can further include the calcination of the mesoporous transition metal oxide composition to form a crystalline transition metal oxide composition. This crystalline transition metal oxide composition has uniform pore sizes from about 10Å to about 50Å in diameter. The mesoporous transition metal oxide composition remains stable upon removal of the surfactant templating agent without requiring use of oxyanion, hydride or halide stabilizers.

The present invention also provides a thermally stable solid oxide fuel cell (SOFC) electrode material that includes a metal-stabilized-zirconia. The surface area of the SOPC material is from about 150 $m^2/g$ to about 500 $m^2/g$. The material preferably has uniform pore sizes from about 10 Å to about 50 Å in diameter.

The metal of the metal-stabilized-zirconia is compatible with zirconia, The compatible metal can be an alkaline earth metal or a transition metal. A preferred compatible metal is yttria. Preferably, the resulting mesoporous transition metal oxide composition includes from about 1 to about 60 atomic % ytria.

In one embodiment the thermally stable solid oxide fuel cell (SOFC) electrode material can further include a third metal. This third metal is a transition metal and is soluble with the metal-stablized-zirconia. This third metal can be titanium or niobium.

In another embodiment the thermally stable SOFC electrode material can further include a third metal incorporated as nanoclusters in the SOFC electrode material. The nanoclusters are uniformly dispersed throughout the SOFC electrode material. This third metal is a transition metal. Examples of this third metal are platinum, nickel, palladium, copper, iron, ruthenium, rhodium or cobalt.

The present invention provides a thermally stable mesoporous transition metal oxide composition that maintains its structural integrity in the temperature range of about 400–800° C. without requiring the use of oxyanion, hydride or halide stabilizers. Upon calcination this composition provides a thermally stable SOFC electrode material that can include yttria-stabilized-zirconium. The surface area of this SOFC material is the highest yet observed for any form of yttria-stabilized-zirconia. By this self-assembly method of making SOFC electrode materials, a single phase material with a homogenous distribution of elemental components is created having intra-granular porosity, thereby allowing for a high TPB region within a single particle with much improved gas permeability/mass transport qualities. These characteristics greatly improve SOFC efficiency and lower operating temperatures to below 600° C. Moreover, the meso-(M)YZ provided by this invention is the first example of a thermally stable mesoporous transition metal oxide, produced from templating with a common ionic surfactant, and that maintains its structural integrity in the temperature range 400–800° C. More importantly, meso-MYZ is the first example of a nesostructure intentionally designed to be ionically conductive and electro-catalytically active for use as electrode materials in SOFCs. These and other advantages of the present invention will be appreciated from the detailed description and examples that are set forth herein. The detailed description and examples enhance the understanding of the invention, but are not intended to limit the scope of the invention.

BRIEF DESCRIPTION OF THE DRAWINGS

Preferred embodiments of the invention have been chosen for purposes of illustration and description, but are not intended in any way to restrict the scope of the invention.

The preferred embodiments of certain aspects of the invention are shown in the accompanying drawings, wherein.

DETAILED DESCRIPTION OF THE PREFERRED EMBODIMENTS

Figure 1A:
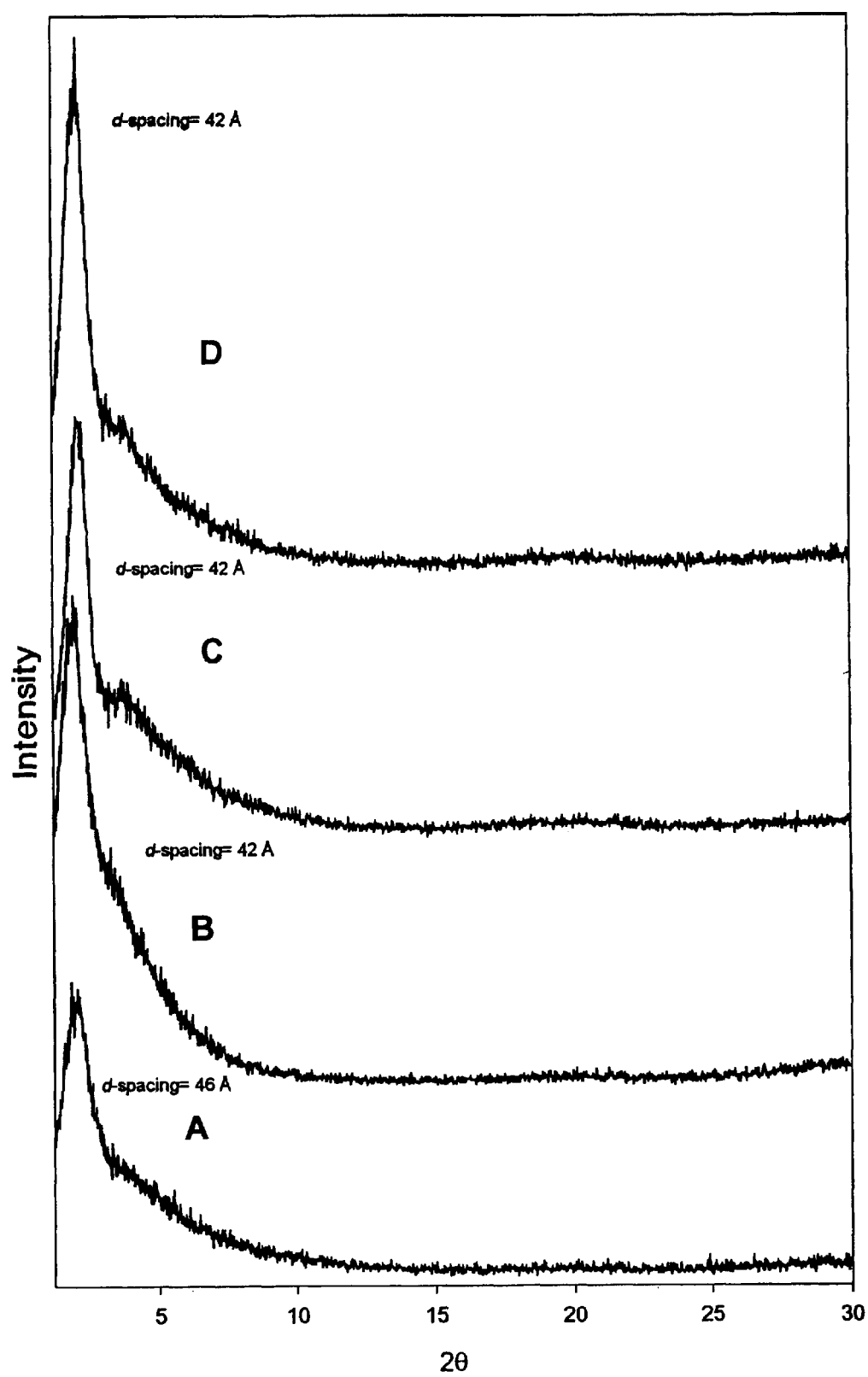
FIG. 1 is a graph of PXRD patterns of meso-YZ materials containing (A) 0.78 Zr: 1 Y, (B) 3.35 Zr: 1 Y, (C) 5 Zr: 1 Y, (D) 8 Zr: 1 Y.
Figure 1B:
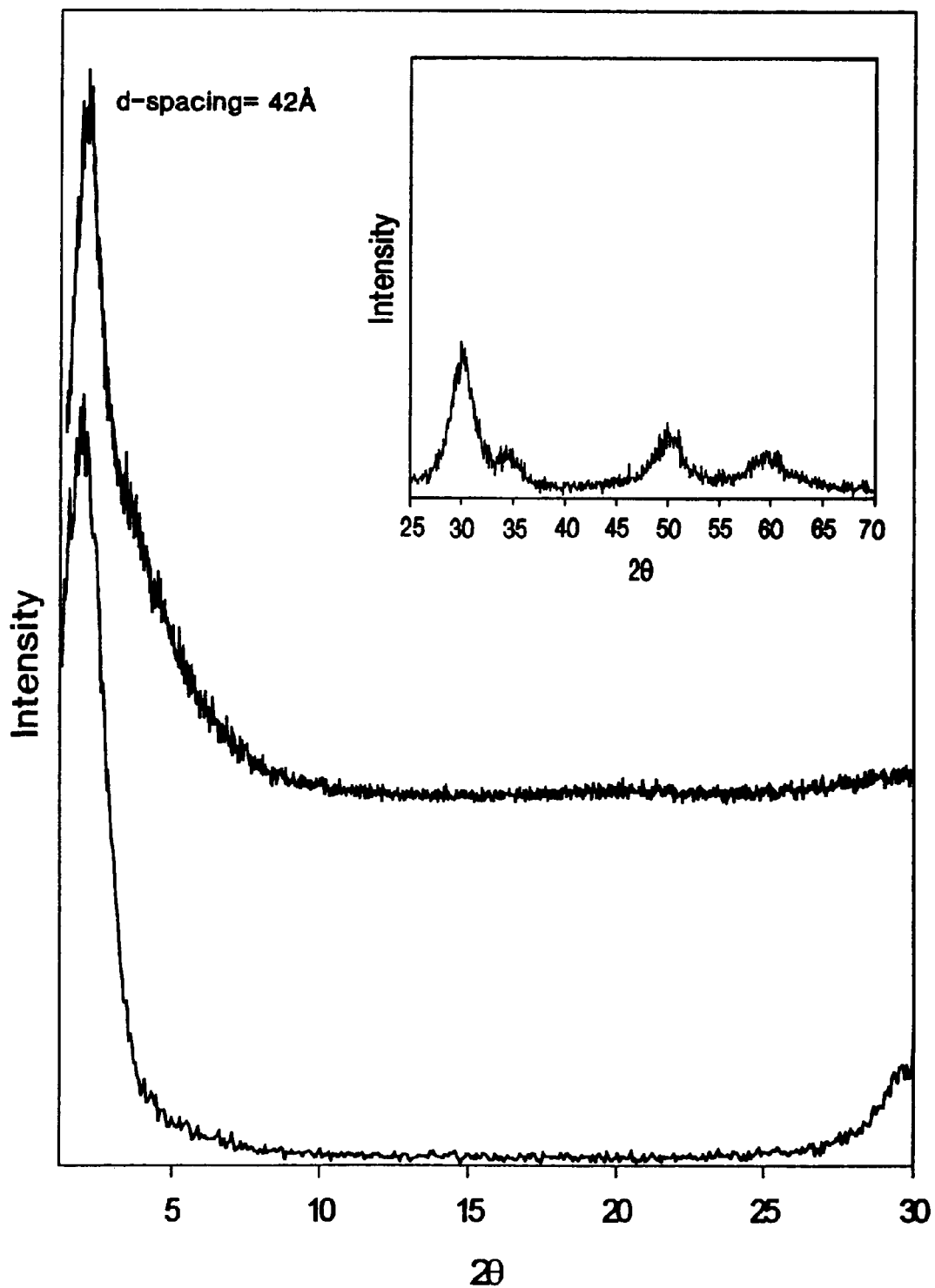
Figure 2A:
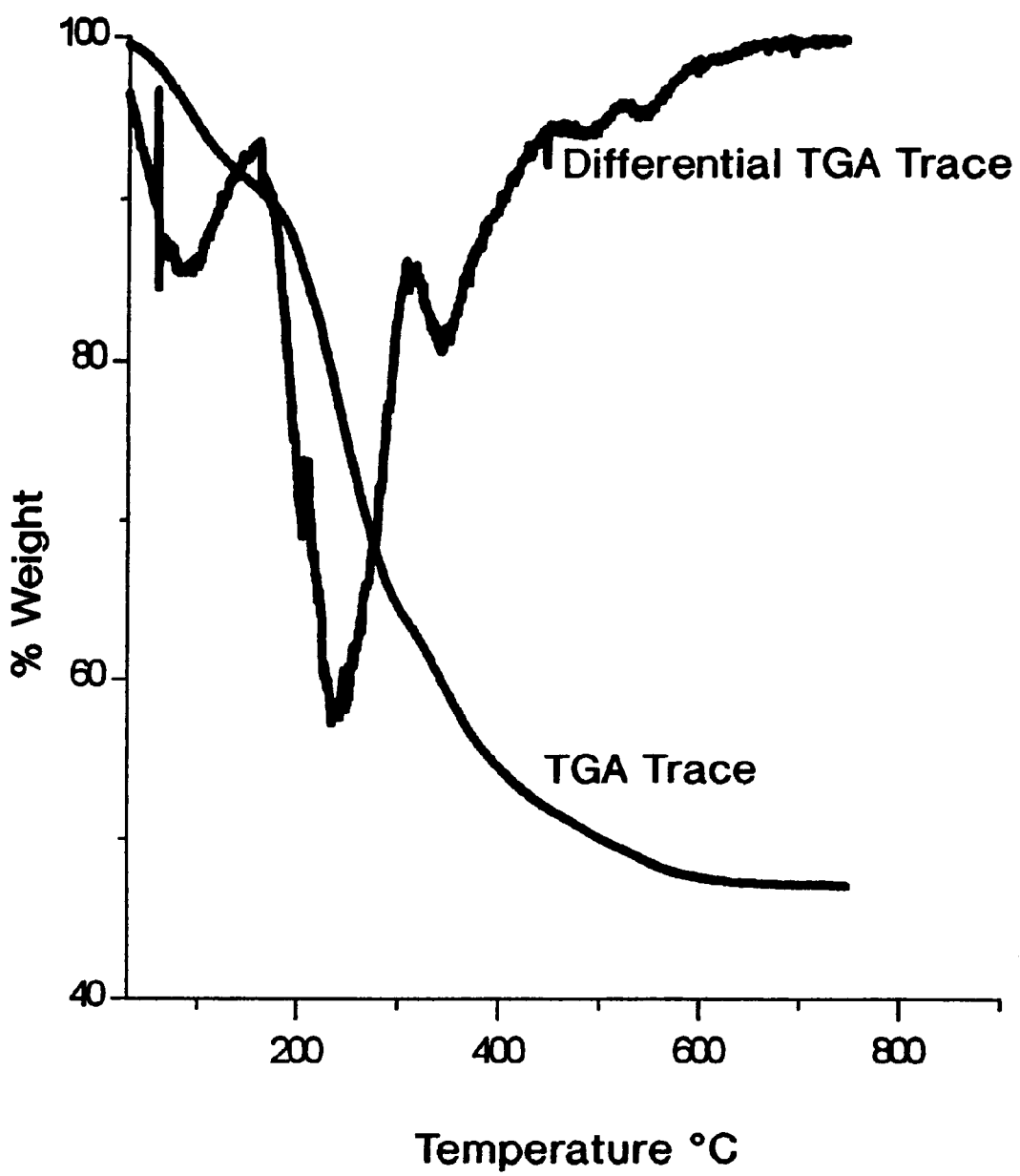
FIG. 2 is a graph of TGA and DTGA traces for glycol-based synthesized meso-YZ (top) and aqueous-based synthesized meso-YZ (bottom) materials.
Figure 2B:
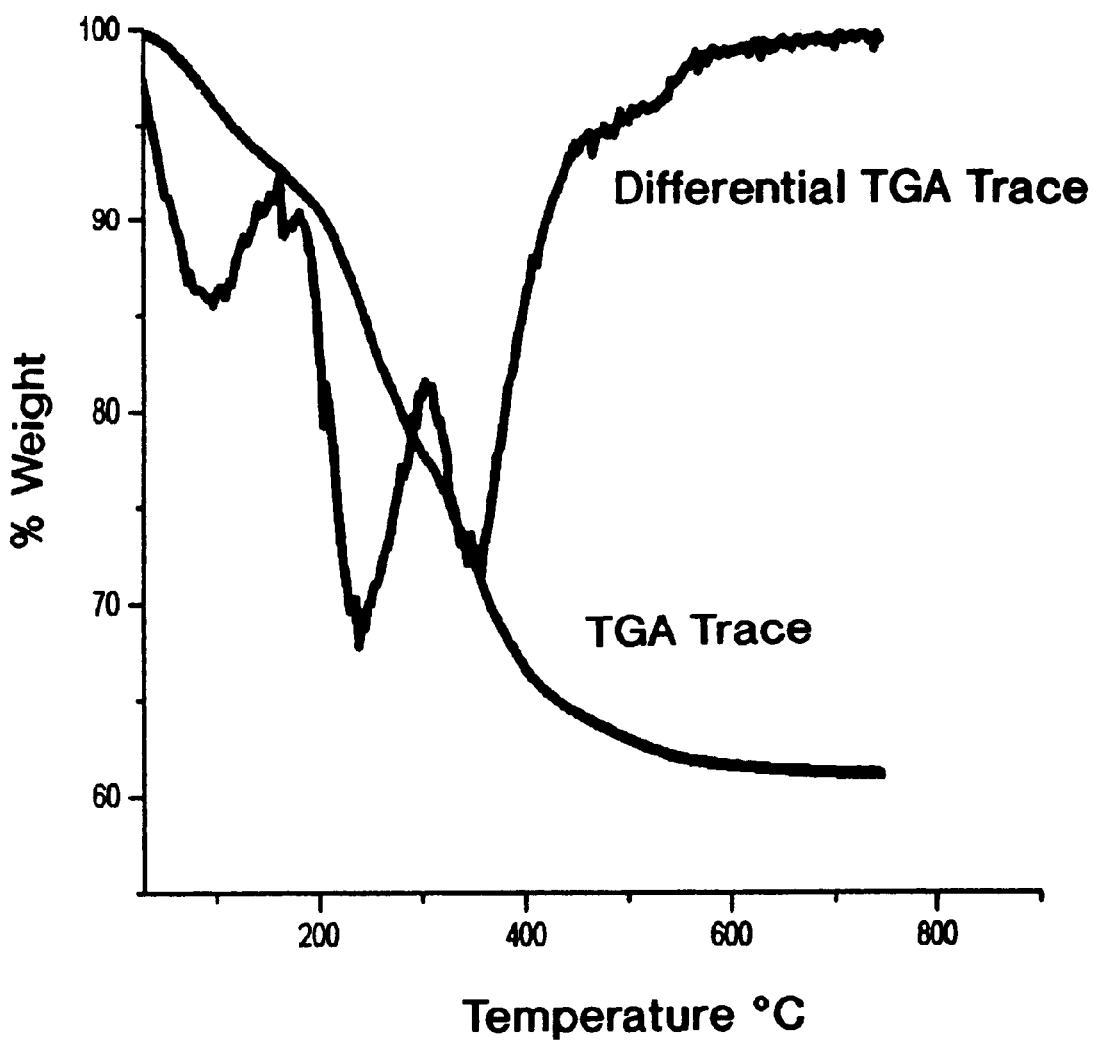

The present invention provides a method of producing a thermally stable mesoporous transition metal oxide composition that can be used as a SOFC electrode material. Glycometallates and metal complexes are co-assembled with a surfactant template to produce a single phase binary or ternary mesoporous-(metal)-yttria-stabilized-zirconia, meso-(M)YZ, which has uniform sized pores and crystalline channel walls, high thermal stability (800° C.) and electro-active catalytic sites, and high ionic/electronic conductivity. By this self-assembly method a single phase material is created having intra-granular porosity, which allows for a high TPB region within a single particle with much improved gas permeability/mass transport qualities. When used as electrodes these meso-(M)YZ materials increase SOFC efficiency and lower operating temperatures to below 600° C.

The method of producing the thermally stable mesoporous transition metal oxide composition includes reacting a transition metal polyol-based gel with a surfactant in an aqueous environment under basic conditions.

The transition metal polyol-based gel is produced by dissolving a source of a transition metal in a polyol-based solvent to form a first solution; dissolving a source of a second metal in a second polyol-based solvent to form a second solution; and then mixing these solutions.

A polyol-based solvent is a solvent that contains a polyhydric alcohol. The polyol-based solvents used in this invention have a high dielectric constant and coordinating ability. The dielectric constant is the index of the ability of a substance to attenuate the transmission of an electrostatic force from one charged body to another. For the purposes of this invention the higher the dielectric constant is; the lower the attenuation of transmission is. A high dielectric constant includes an $\epsilon$ greater than about 40. Coordinating ability is a thermodynamic description of the ability of an ionic or molecular species to bind to a metal center to form a coordination complex. It is usually quantified by spectroscopic or calorimetric methods and expressed in terms of crystal or ligand field strength, stability or binding constants. The higher the coordinating ability is of the solvent used in the present invention, the more easily the solvent chelates metals. The high dielectric constant and coordinating ability of such solvents break down the polymeric structure of the yttrium precursor, for example, into a useful soluble form to facilitate mesophase synthesis. Some examples of polyol-based solvents with a high dielectric constant and coordinating ability are ethylene glycol and tetraethylene glycol. The preferred solvent for this invention is ethylene glycol. When ethylene glycol is used as the solvent, the transition metal polyol-based gel formed is based on a glycometallate.

The transition metals used in this invention to form the transition metal polyol-based gel can be any of the transition metals. Examples of a source of the transition metal are transition metal alkoxides, transition metal glycolates or transition metal acetates. Preferred transition metal alkoxides are zirconium alkoxide, yttrium alkoxide, scandium alkoxide or rare earth alkoxides, The most preferred source of a transition metal alkoxide is zirconium ethoxide.

The second metal used in this invention to form the transition metal polyol-based gel can be any metal. Examples of a source of the second metal are metal alkoxides, metal glycolates or metal acetates. Preferred metal alkoxides are yttrium alkoxide, scandium alkoxide, rare earth alkoxides, calcium alkoxide and magnesium alkoxide. The most preferred source of the second metal is yttrium acetate, Preferably, the resulting mesoporous transition metal oxide composition includes from about 1 to about 60 atomic % yttria.

The surfactant used in this invention can be any surfactant. Neutral or cationic surfactants are preferred for use in this invention. An example of a cationic surfactant is a long-chain alkyl substituted ammonium salt. An example of a neutral surfactant is a long-chain alkyl substituted polyethylene oxide. An example of a long-chain alkyl substituted ammonium salt is cetyltrimethyl ammonium bromide. An example of a long-chain alkyl substituted polyethylene oxide surfactant is polyoxyethylene 10 lauryl ether. Cetyltrimethyl ammonium bromide is the preferred surfactant to be used in this invention.

The reaction of a transition metal polyol-based gel with a surfactant in an aqueous environment to form the mesoporous transition metal oxide composition takes places under basic conditions. The pH in which this reaction takes place is preferably from about 8 to about 14.

The resulting mesoporous transition metal oxide composition preferably has pores that have a diametral dimension of about 20 Å to about 100 Å. The pore size distribution of the composition is uniform and the exact size dimensions depend upon the length of the surfactant chain or swelling agents used. The pore architecture of these materials are of the "worm hole" variety; that is, the pores are uniform in size but randomly organized leading to a highly interconnected network of void channels within the oxide. One of the advantages of using a "worm hole" porous structure is that gaseous species can be easily re-routed to other channels circumventing structural defects, which may disrupt the channel. Therefore, the "worm hole" porous structure allows for greater accessibility to surface sites for gaseous species in, for example, catalysis and adsorption.

In one embodiment, the method can further include the addition of a metal precursor to the transition metal polyol-based gel. This would result in the formation of a mesoporous ternary transition metal oxide composition. The resulting composition is ternary since it includes three metals and/or metal oxide components. The metal precursor can be a platinum precursor, a nickel precursor, a palladium precursor, a copper precursor, an iron precursor, a ruthenium precursor, a rhodium precursor or a cobalt precursor. Preferably the metal precursor to be used in the present invention is a nickel precursor or a platinum precursor. An example of a platinum precursor is hexachloroplatinate. Examples of nickel precursors are nickel acetate, nickel chloride and nickel nitrate.

The mesoporous transition metal oxide composition of this invention is thermally stable. The composition maintains its structural integrity upon heating up to 800° C. The structural integrity is maintained even upon the removal of the surfactant templating agent without requiring use of oxyanion, hydride or halide stabilizers.

The method can further include the calcination of the mesoporous transition metal oxide composition. Calcination of the composition leads to combustion of the organic components in the inorganic framework, i.e., the templating surfactant and the organic components of the glycolmetallate precursor. Upon calcining, the mesoporous transition metal oxide composition transforms into a crystalline transition metal oxide composition. The channel walls of the crystalline transition metal oxide composition are about 25–28 Å in thickness. The composition has uniform pore sizes. Preferably, the pore sizes are from about 10 Å to about 50 Å in diameter. This mesoporous transition metal oxide composition has utility as an electrode material in SOFCs.

The present invention also provides a thermally stable solid oxide fuel cell (SOFC) electrode material. The SOFC electrode material is ionically conductive and electrocatalytically active. The electrode material includes a metal-stabilized-zirconia. The surface area of the SOFC material is from about 150 m$^2$/g to about 500 m$^2$/g. The material has uniform pore sizes from about 10 Å to about 50 Å in diameter. The uniform pore structures of these materials are maintained intact up to 800° C. Zirconia can be zirconia dioxide (ZrO$_2$).

The metal of the metal-stabilized-zirconia is a metal that is compatible with zirconia. A metal that is compatible with zirconia is a metal that allows the SOFC electrode material to be ionically conductive. Such compatible metals are metals that have lower oxidation states than zirconium (IV); and therefore, oxygen vacancies are created in the zirconium lattice allowing for ionic conductivity of the electrode material. Metals with lower oxidation states than zirconium (IV) stabilize the ionically conducting "cubic" form of zirconia. Examples of such metals for use in the present invention are alkaline earth metals or transition metals. More specific examples of such metals are yttrium (III) and calcium (II). A preferred compatible metal is yttrium (III).

Preferably, the resulting mesoporous transition metal oxide composition includes from about 1 to about 60 atomic % ytria Yttria can be yttria sesquioxide ($y_2O_3$)

In one embodiment a third metal can be added to the electrode material to form a mixed conducting system. A mixed conducting system is a system with the ability to conduct ions and electrons. This third metal is soluble with the metal-stabilized-zirconia. This third metal is a transition metal. An example of such a third metal for use in the present invention is a transition metal with unpaired electrons. Examples of such third metals are titanium (III) and niobium (IV).

In another embodiment the thermally stable SOFC electrode material can include a third metal incorporated as metal nanoclusters in the SOFC electrode material. This third metal is a transition metal. With this third metal, a ternary structure is formed. The nanoclusters are uniformly dispersed throughout the SOFC electrode material. In a metal nanocluster a metal atom is bonded to another like metal atom to form a metal-metal bonded cluster. Nanoclusters of the present invention have diameters that are comparable to the size of the pores of the electrode material. The nanoclusters reside in the intra-granular regions around, near, or in the pores. The additional transition metal that forms the nanoclusters can be platinum, nickel, palladium, copper, iron, ruthenium rhodium or cobalt. Platinum and nickel are preferred. Platinum can preferably be included in a range from about 1 to about 10 atomic percentage. Nickel can preferably be included in a range from about 5 to about 40 atomic percentage.

EXAMPLE OF A PREFERRED EMBODIMENT

A preferred embodiment of the methods of the instant invention is as follows. Meso-PtYZ precursors co-assemble after the initial mixing to create mesophase through electrostatic interactions of anionic YZ glycolate and hexachloroplatinate species with the cationic surfactant, CTAB, micellar template. After 5 days at 80° C., the anionic species of the platinum-yttrium-zirconium composite mesophase connect weakly via bridging glycol or acetate groups as indicated by the outer black circle. (See FIG. 13.) Calcination at 600° C. leads to the formation of a mesostructure composed of cubic YSZ nanocrystallites of ~30 Å in size, which are depicted as gray cubes, and Pt clusters of the same order of magnitude, which are depicted as black ovals. The template-free material retains its structural integrity to around 800° C., demonstrating its utility as a SOFC electrode material.

EXAMPLES (a) Meso-YZ -Aqueous Preparation. 5 g of zirconium ethoxide (99+%, Strem) and 1.66 g NaOH were added to 50 ml of ethylene glycol (99.9%, Aldrich). This mixture was refluxed overnight under flowing nitrogen to form a clear solution, after which, excess ethylene glycol was distilled off creating a thick, clear yellow gel denoted as zirconium glycolate. Separately, anhydrous yttrium acetate (99.9%, Alfa) was added to 30ml ethylene glycol. This mixture, denoted yttrium glycolate, became clear within 30 minutes while stirring under nitrogen. The zirconium and yttrium species were then mixed together in a drop wise fashion forming a much thicker white, gelatinous species denoted YZ glycolate. Typically, ¼ to ⅕ of this gel was added to a poly(propylene) bottle containing 30 ml $H_2O$, 1 g cetyltrimethylammonium bromide (CTA13) (Aldrich), and 0.4 g NaOH. After stirring initially for 20 minutes, each bottle was heated at 80° C. for 5 days. The contents of the bottles were recovered by suction filtration and were washed with distilled water.

(b) Meso-YZ-Glycol Preparation, The YZ glycolate was formed as per above. This gel was added to a poly (propylene) bottle containing 30ml ethylene glycol, 1 g of CTAB, and 0.4 g of NaOH. After initial stirring, each bottle was heated at 80° C. for 5 days. The bottles were allowed to cool at room temperature forming a very thick brownish coagulation. Hydrolysis was achieved by adding the contents of the bottles to 200 ml water and a variable amount of NaOH. A powder cake was collected by suction filtration and was washed with distilled water.

(c) Meso-PtYZ -Aqueous Preparation. Sodium hexachloroplatinate (IV), $Na_2PtCl_6$ (98%, Aldrich), was pre-dissolved in a small amount of water. This yellow solution was then added to a poly(tpropylene) bottle containing the mixture prepared in (a). The as-synthesized powder cake was black in color and remained black after calcination in air.

(d) Meso-NiYZ-Aqueous Preparation, Either nickel acetate, nickel nitrate or nickel chloride was pre-dissolved in warm ethylene glycol. This green solution was then added to a poly(propylene) bottle containing the mixture prepared in (a). The as-synthesized powder cake was green in color and turned black after calcination in air.

(e) Meso-(M)YZ-Characterization. Powder X-ray Diffraction (PXRD) data were obtained on a Siemens D5000 diffractometer using Ni filtered Cu Kα radiation ($\lambda$=1.54178 Å) with a Kevex 2005–22 solid state detector. Variable temperature (VT) PXRD data were obtained by using the variable temperature stage attachment. Thermogravimetric Analysis (TGA) analyses were performed on a Perkin Elmer 7 Series Thermal Analysis System using Perkin Elmer 7 TAS software version 3.00. All samples were held in a platinum sample holder and were heated under a nitrogen atmosphere at 5°/minute. Transmission Electron Microscopy (TEM) images were obtained on a Phillips 430 microscope operating at 100 kV. Samples were embedded in TAAB epoxy matrix, cured at 60° C. for 24 hrs and sectioned using an ultra-microtome and a diamond knife. The 100 to 300 Å thin sections were then mounted on a copper grid. HR-FE-STEM imaging was done on a JEOL 210 F field emission microscope operating at an accelerating voltage of 200 kV. Nitrogen adsorption and de-sorption isotherms were performed at 77K. All samples were out-gassed at 200° C. X-ray photoelectron spectroscopy (XPS) was performed using a Laybold MAX 200 XPS apparatus with Mg Kα radiation. The carbon 1s peak at 285 eV was used for calibration. Mid-IR spectra (4000–400 $cm^{-1}$) were recorded on a Nicolet 20SXB spectrometer with a resolution of 2 $cm^{-1}$. Solid samples were pressed into KBr pellets while gel samples sat between two solid NaCl discs.

Figure 1:
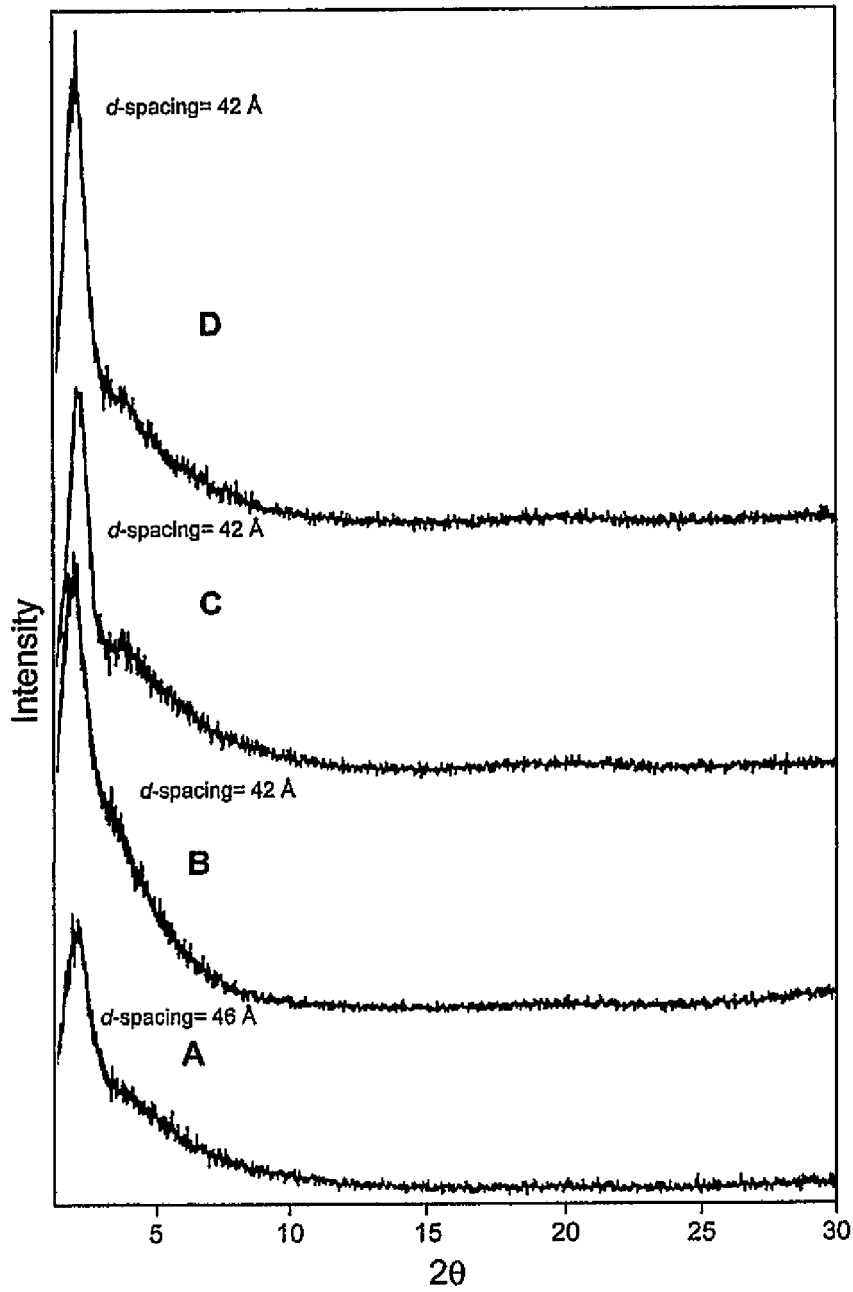
Figure 2A:
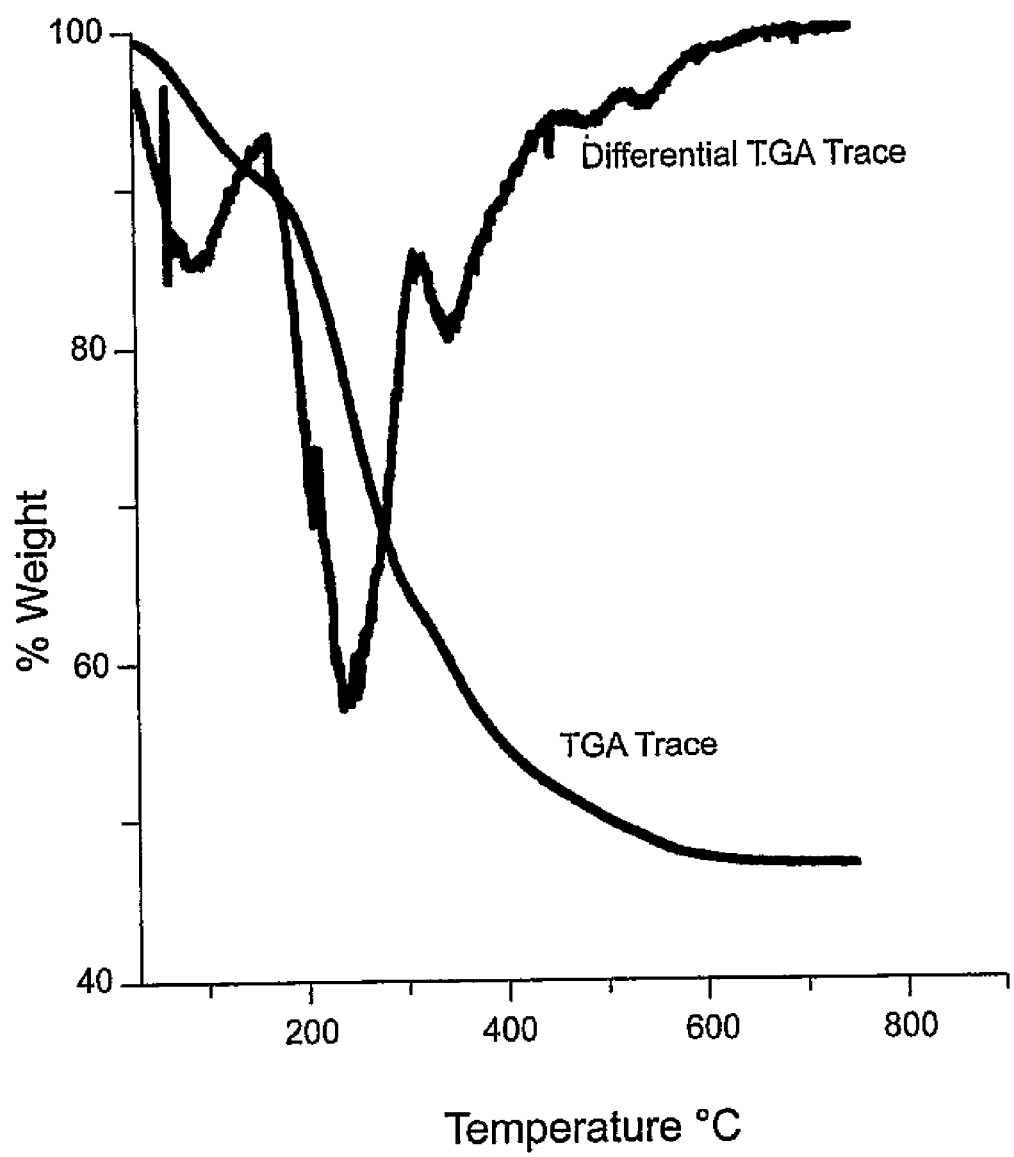
Figure 2B:
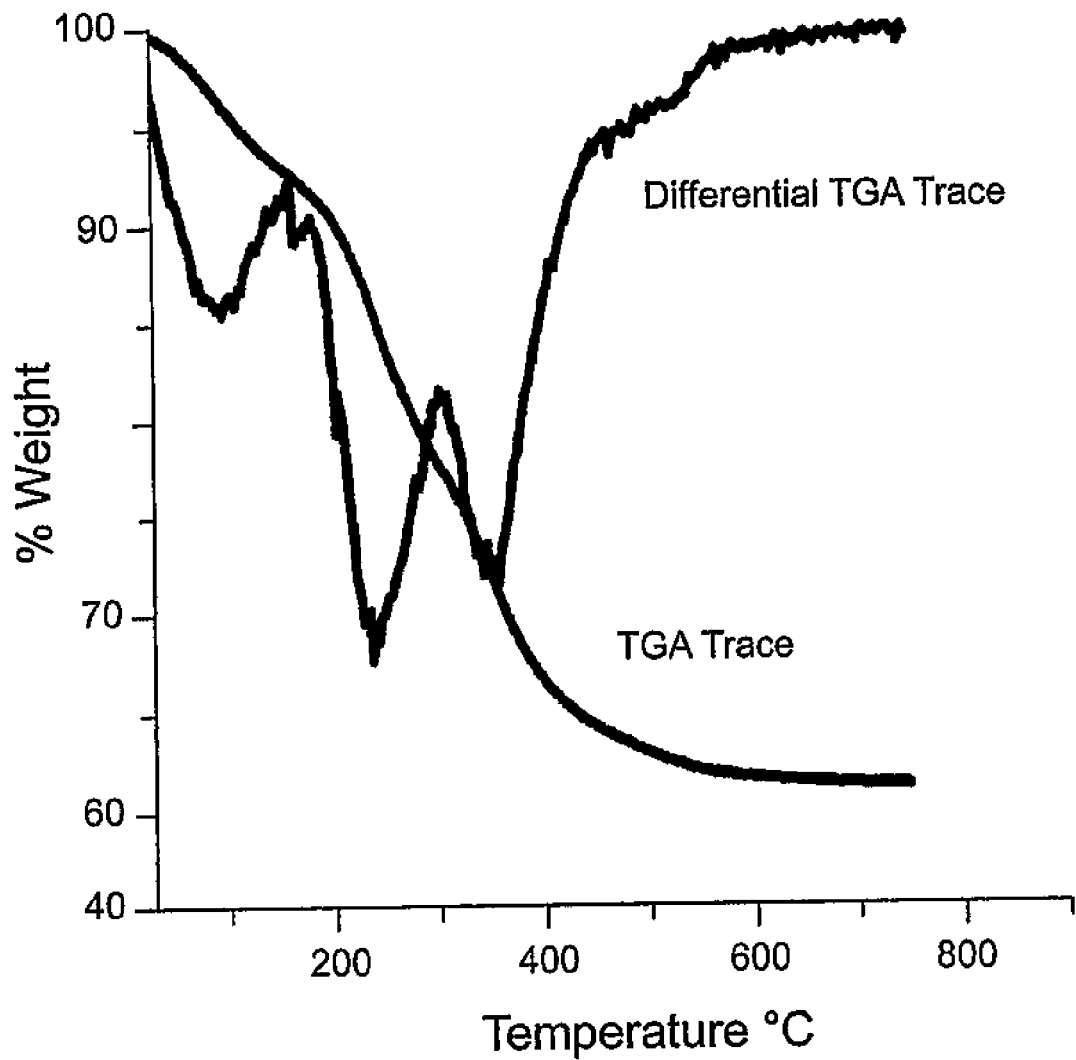
Figure 3:
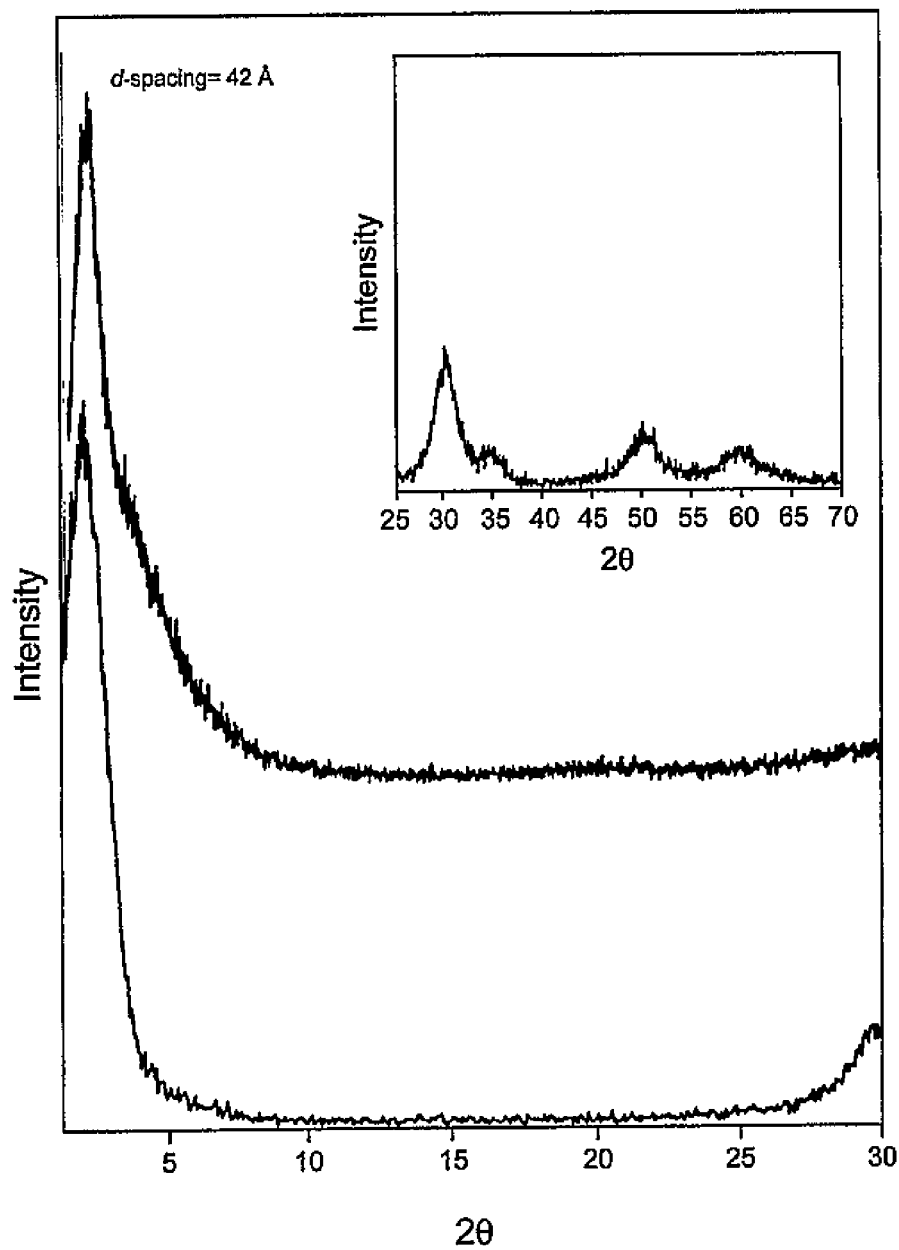
Figure 4:
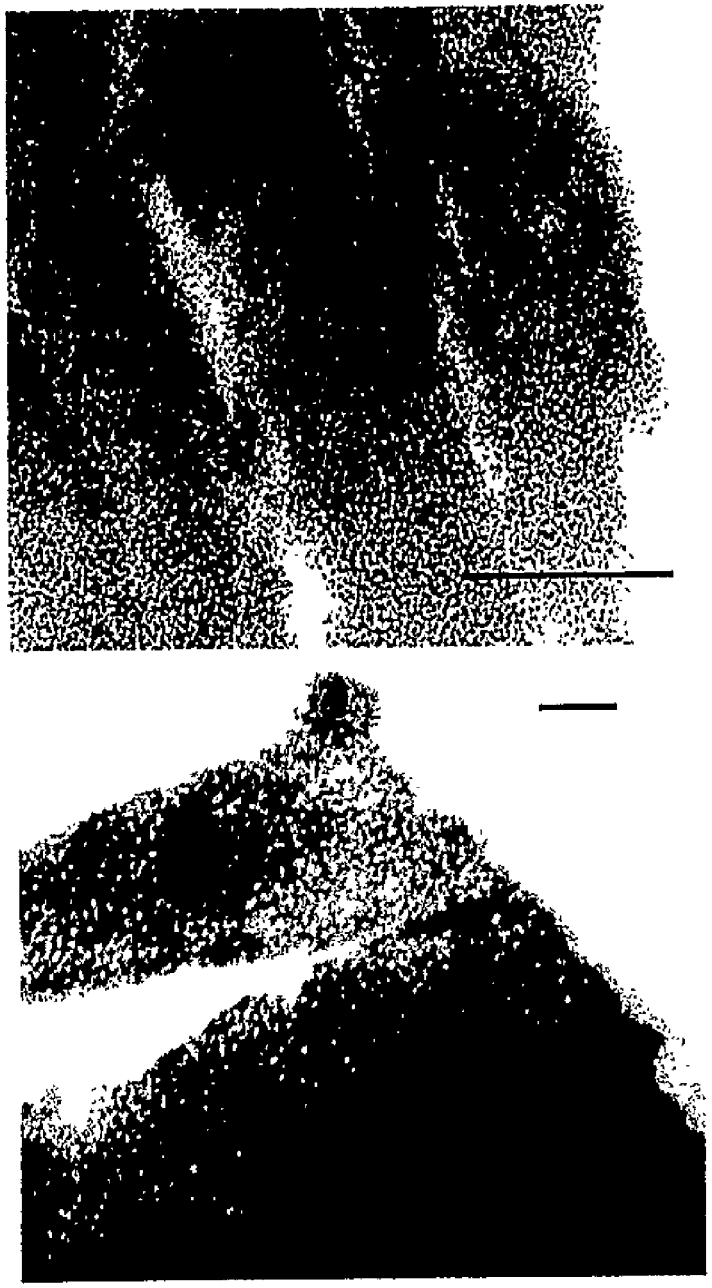
Figure 5:
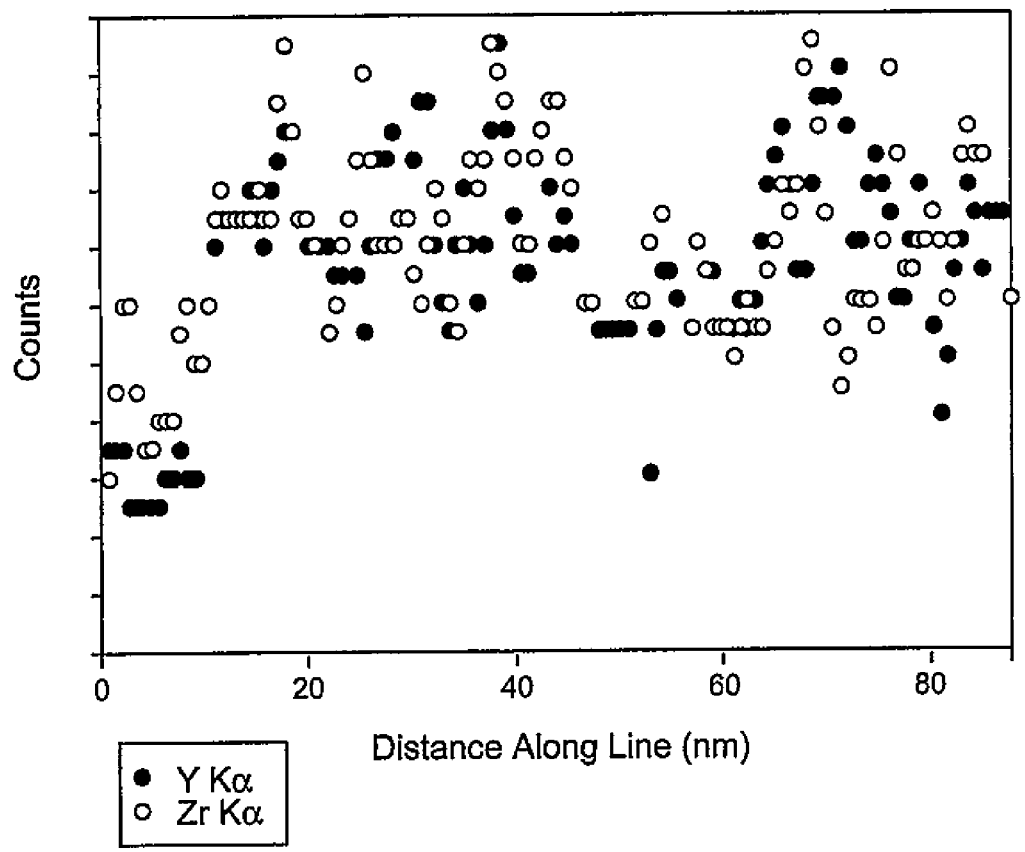

Meso-YZ. Both the aqueous and glycol based routes for synthesizing meso-YZ demonstrate the ability to a form a solid solution with respect to yttrium and zirconium. FIG. 1 shows PXRD patterns of low angle reflections for a series of meso-YZ samples containing 12–56 atomic % yttrium, which were prepared through the aqueous route. The sample containing 56 atomic % yttrium results in a noticeably broader low-angle peak at slightly higher d-spacings, which may be indicative of less ordered mesopores as perceived from extensive comparison of TEM images. A comparison of PXRD patterns of the aqueous and glycol derived as-synthesized meso-YZ materials essentially shows no difference between the two materials, however, upon calcination, only the meso-YZ derived from the aqueous preparation was deemed to retain a significant portion of the mesostructure from PXRD and gas adsorption analysis.

TGA of meso-YZ made under aqueous and glycol conditions demonstrates two significant differences in the as-synthesized material, which gives insight into the reason for thermal stability encountered with the aqueous preparation, FIG. 2. First, glycol-based meso-YZ loses about 16% more mass than that of aqueous-based meso-YZ, indicating that the thermally stable meso-YZ has less organic constituents in its as-synthesized form. Thus its structure is more fully hydrolyzed and has a higher degree of condensation than its counterpart. The differential weight loss curves show three distinct losses for both materials with the last accounting for the major difference between the two curves. This weight loss occurs just above 300° C. and can be assigned to either Y/Zr-OH condensation and/or loss of acetate/glycol groups. Glycol-based meso-YZ gives a weight loss of only 3% above 300° C. while aqueous-based meso-YZ loses about 13% by mass, indicating that although aqueous meso-YZ contains less total organic mass within its structure, it is retained until a higher temperature as confirmed through pyrolysis mass spectrometry.

Figure 3:
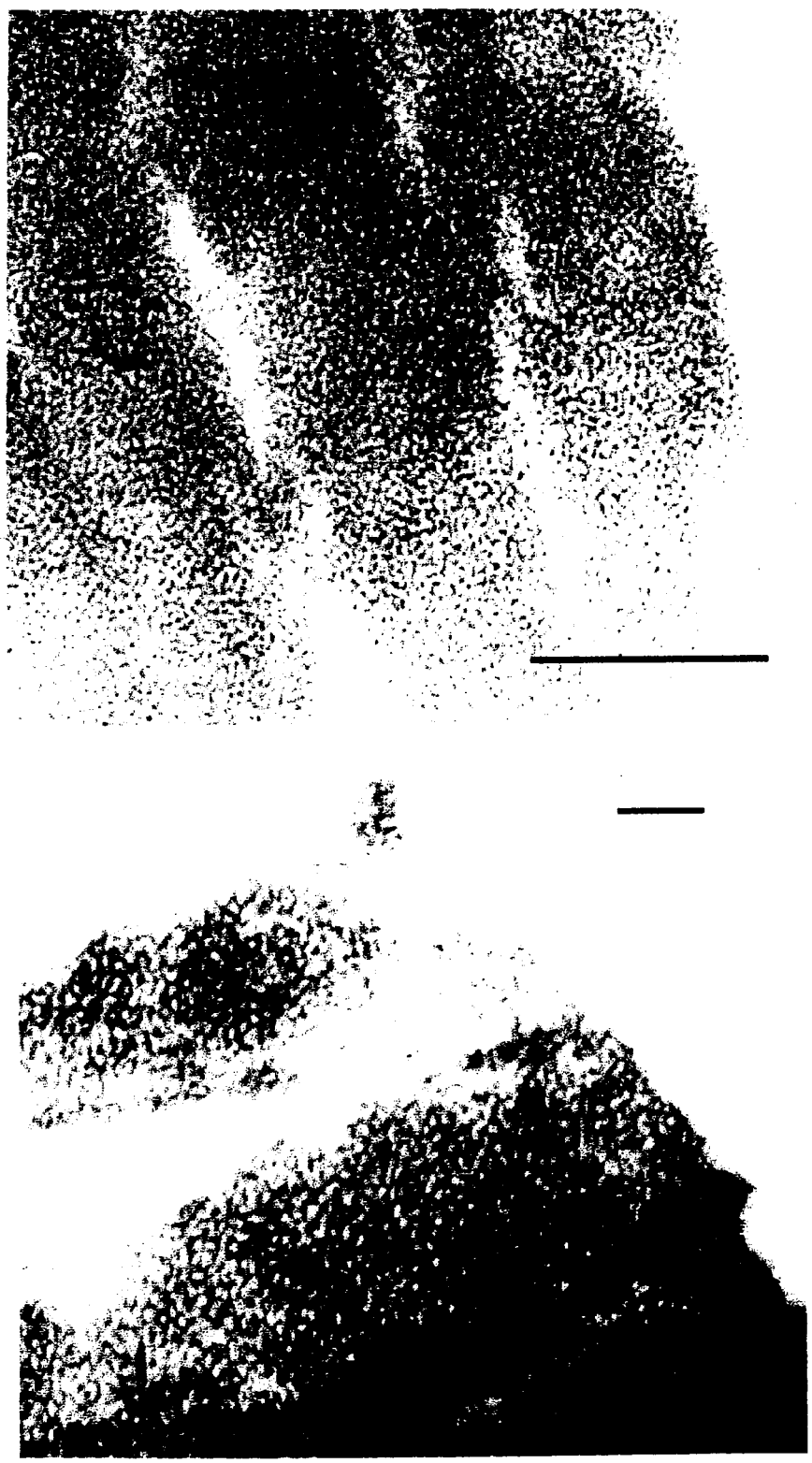
FIG. 3 is a graph of PXRD of meso-YZ (3.35 Zr: 1 Y) material prepared by the aqueous method. Top: as-synthesized. Bottom: sample calcined at 600° C. Inset: high-angle meso-YZ peaks.

Meso-YZ materials demonstrate surprisingly high structural stability upon calcination in air. In fact, meso-YZ shows no loss of the low angle PXRD peak intensity up to at least 600° C. as seen in FIG. 3. These PXRD patterns are for the as-synthesized and calcined samples containing 30% yttrium (12 hours ramp to 600° C., held for 3 hrs and then allowed to cool to ambient temperature). As displayed in the inset of FIG. 3, reflections corresponding to nanocrystalline yttria-stabilized-zirconia, nc-YSZ, begin to emerge upon calcination above 400° C. These reflections gradually grow in intensity and sharpen upon heating to higher temperatures. A comparison of PXRD, nitrogen adsorption isotherms and high resolution-field emission-TEM images, show that these higher angle peaks correspond to crystallization of the channel walls with little concurrent reduction of the pore diameter.

Figure 4:
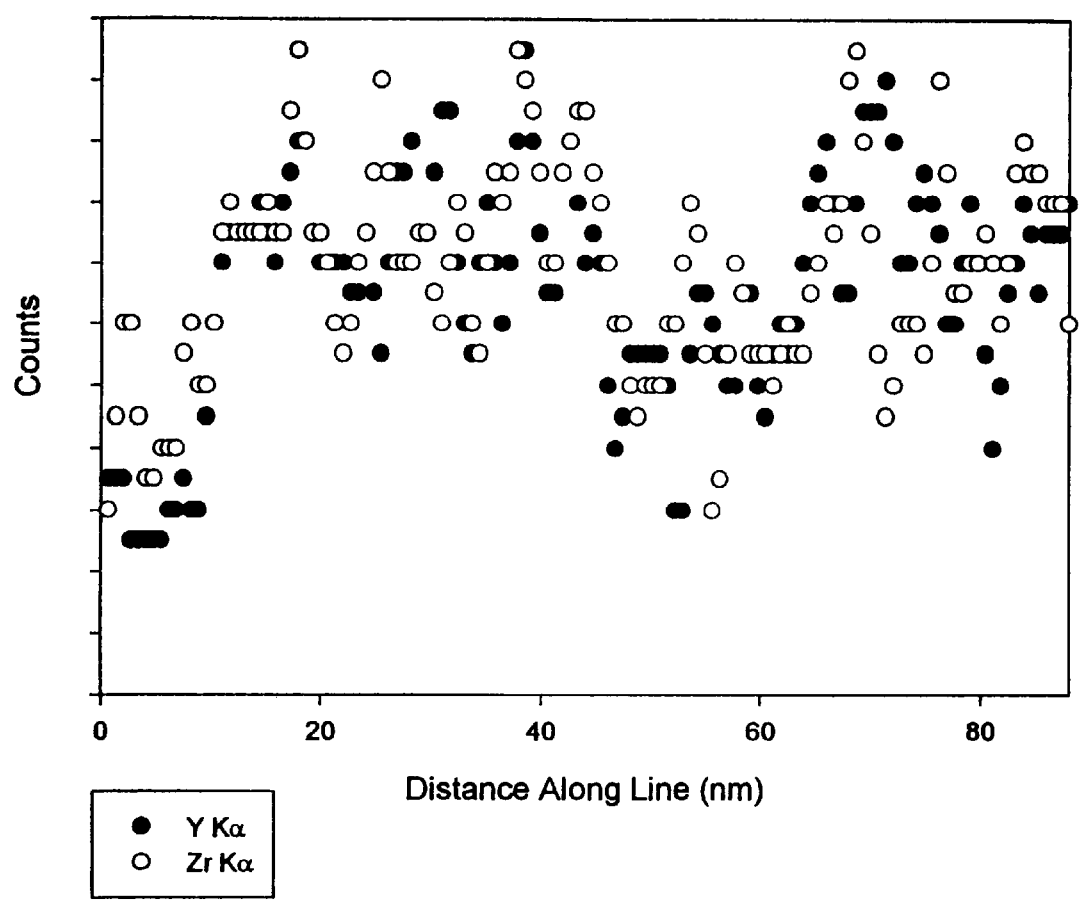
FIG. 4 is TEM images of microtomed section of meso-YZ materials. Left: as-synthesized 20 atomic % yttrium sample. Magnification bar=175 Å. Right: 57.9 atomic% yttrium sample calcined at 600° C. Magnification bar=225 Å.
Figure 5:
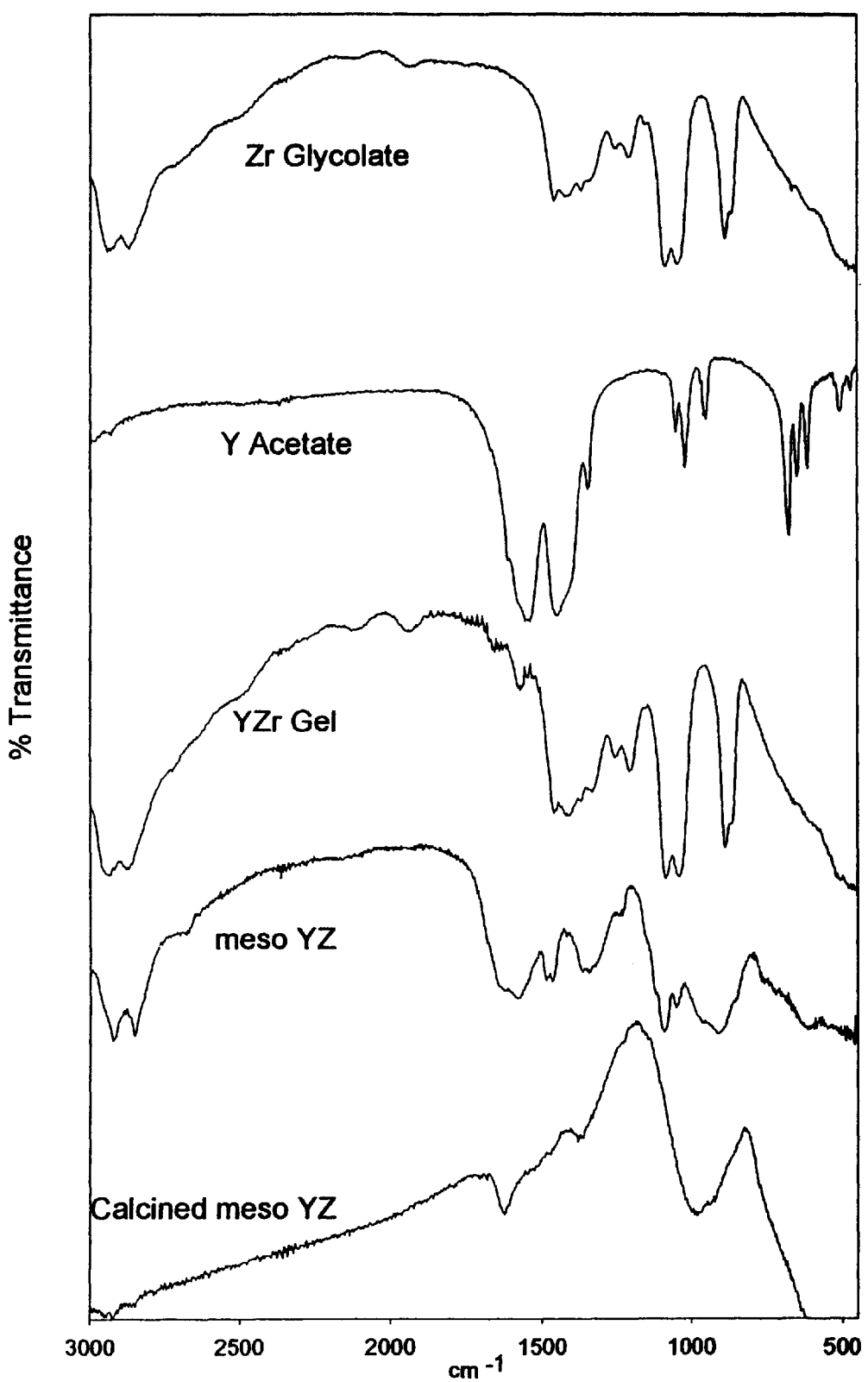
FIG. 5 is a graph of HR-FE-STEM EDX line scan of meso-YZ containing 57.9 atomic % Y.
Figure 6A:
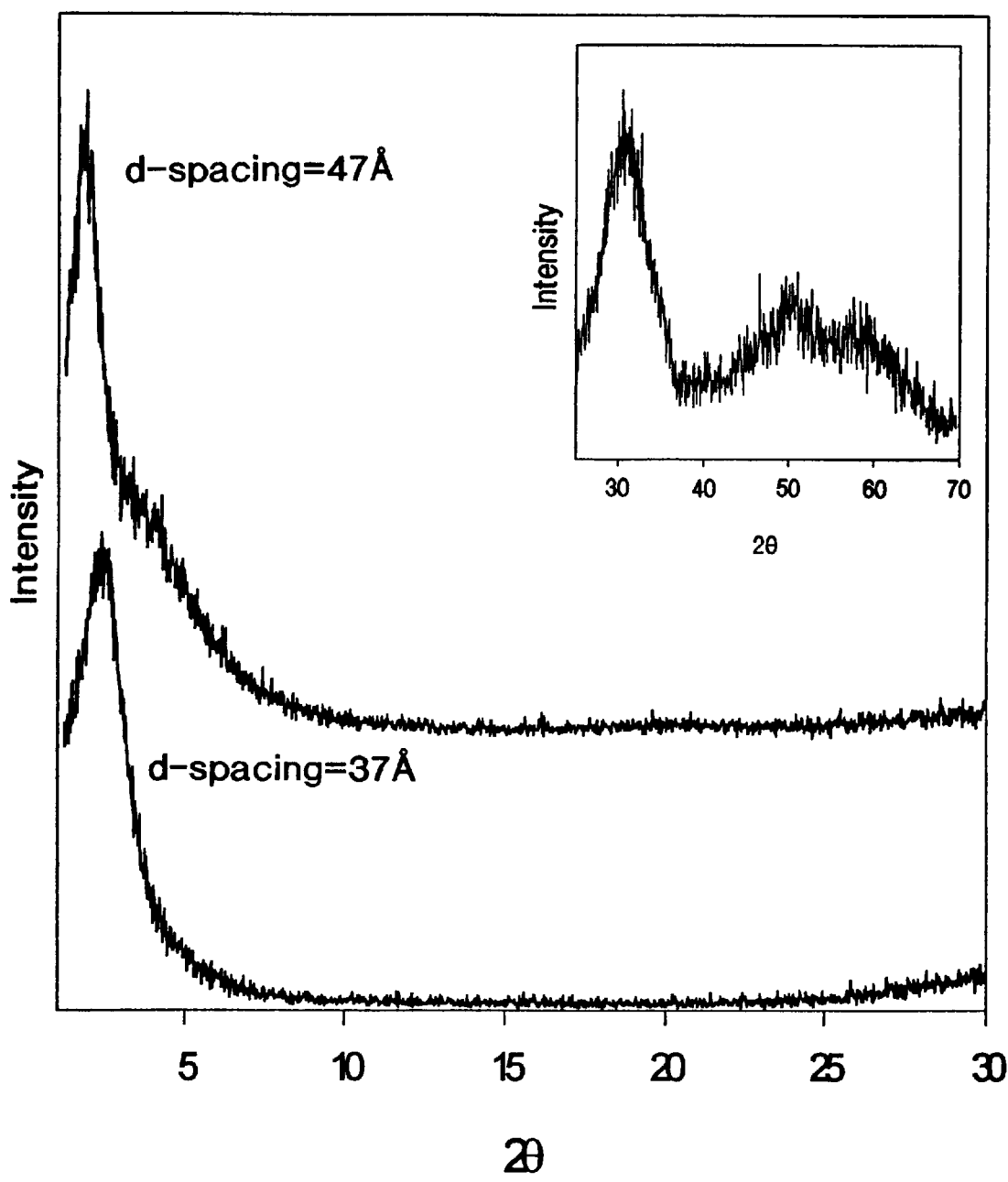
FIG. 6 is a graph of FTIR fingerprint spectra of precursors and products in the synthesis of meso-YZ.
Figure 6B:
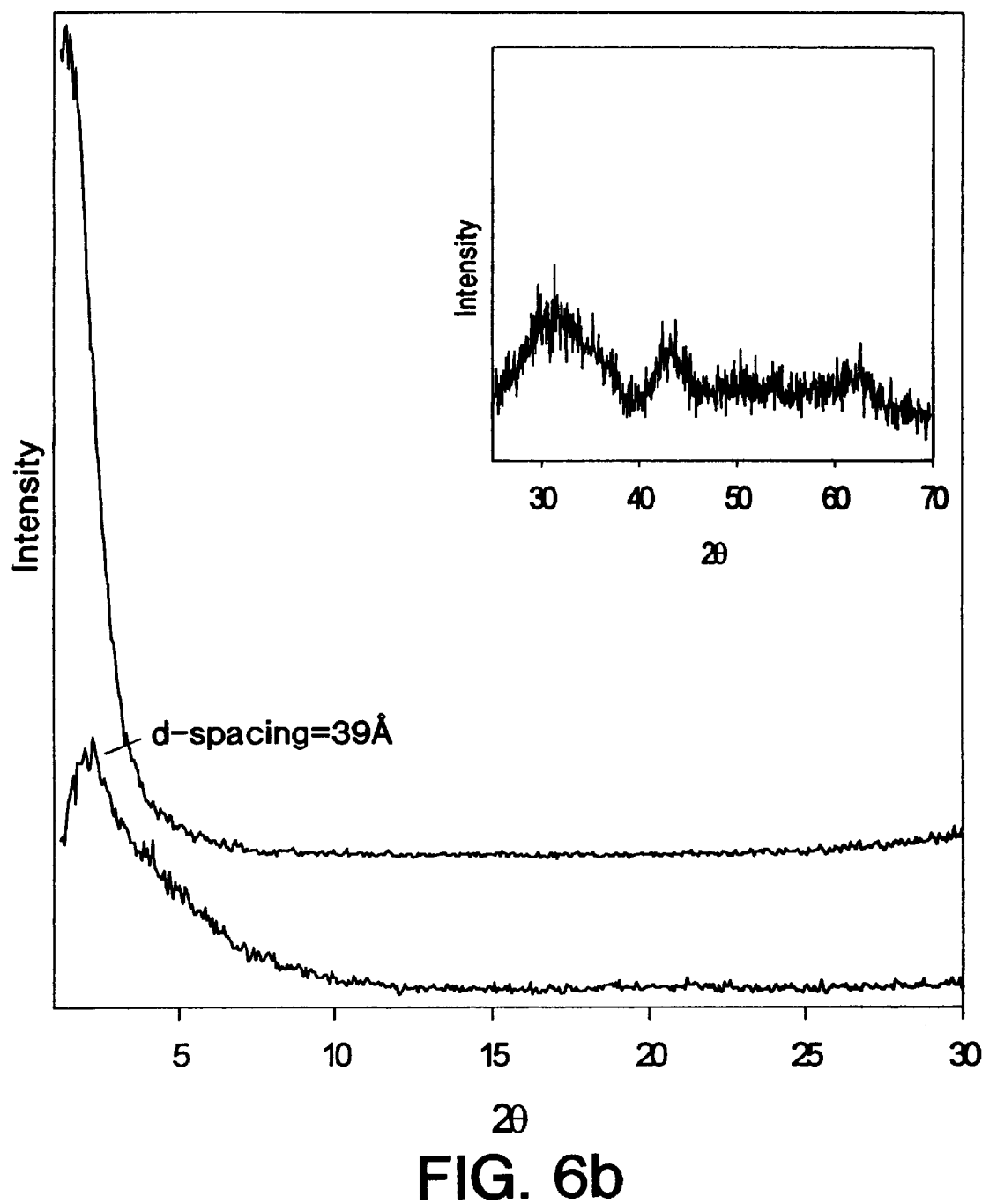
Figure 7A:
FIG. 7 is a graph of PXRD comparison of as-synthesized and calcined versions of (a) meso-PtYZ and (b) meso-NiYZ. Insets: high-angle region.
Figure 7B:
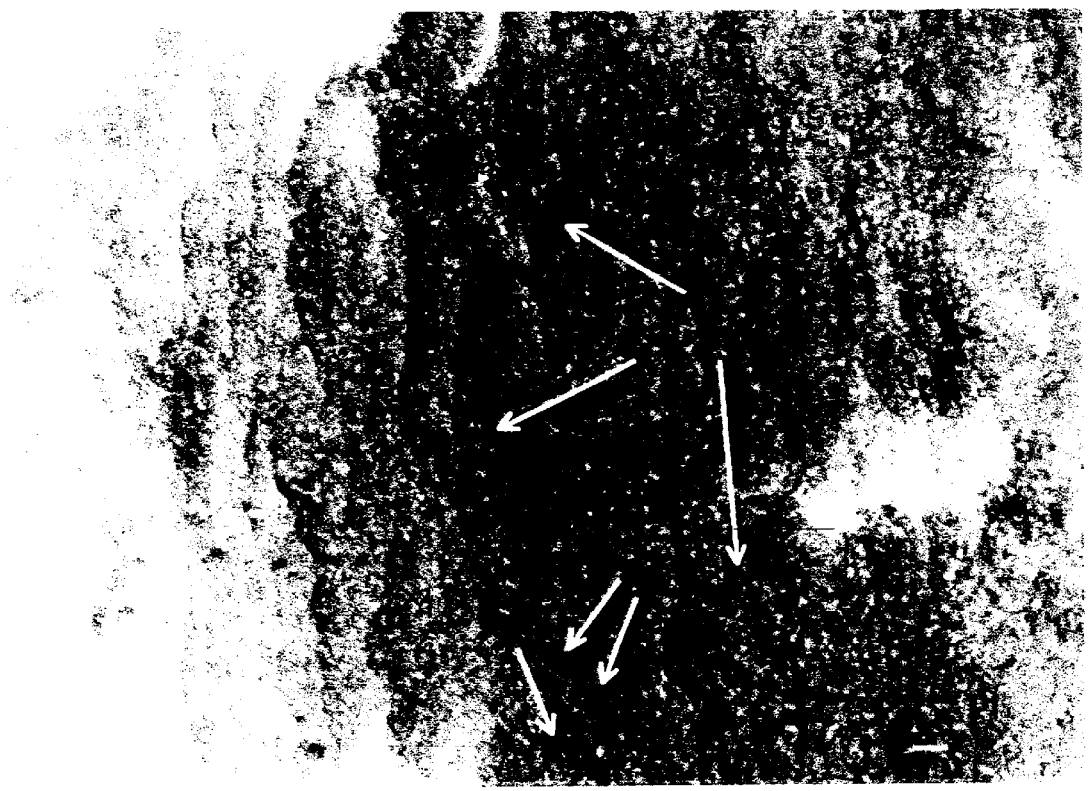

TEM analysis of as-synthesized and calcined meso-YZ samples confirm the presence of a network of uniform sized mesopores, as seen in FIG. 4. The pore architecture of these materials is best described as the "worm hole" variety. These kinds of structures have an advantage for certain applications in terms of greater accessibility to surface sites for gaseous species in, for example, catalysis and adsorption. This is mainly due to the fact that gaseous species in a "worm hole" porous structure can be easily re-routed to other channels circumventing structural defects, which can disrupt the channel continuity, for instance in hexagonal array of channels causing blockage to gaseous mass transport. Also, the calcined meso-YZ samples display some variation in color contrast giving rise to a "mottled" appearance in TEM images. In order to rule out the possibility of yttria and zirconia phase segregation, HR-FE-STEM line scans were performed on a sample containing 56% yttrium, which was deemed most likely to contain separate phases as it was previously noted as having the least order as evident from PXRD. A line of 88 nm in length crossing over both light and dark contrast regions was scanned 6000 times across the mesostructured sample. As seen in FIG. 5, which relates the relative concentration of Y and Zr as a function of distance along the line, the rise and fall of Y and Zr Kα emission intensity directly coincide ruling out the possibility of separate $ZrO_2$ and $Y_2O_3$ domains in the mesostructure. Energy dispersive X-ray microanalysis (EDX) confirms the presence of both yttrium (III) and zirconium (IV) in all samples and their relative amounts correspond well with the initial stoichiometry of reactants in the synthesis.

Figure 6:
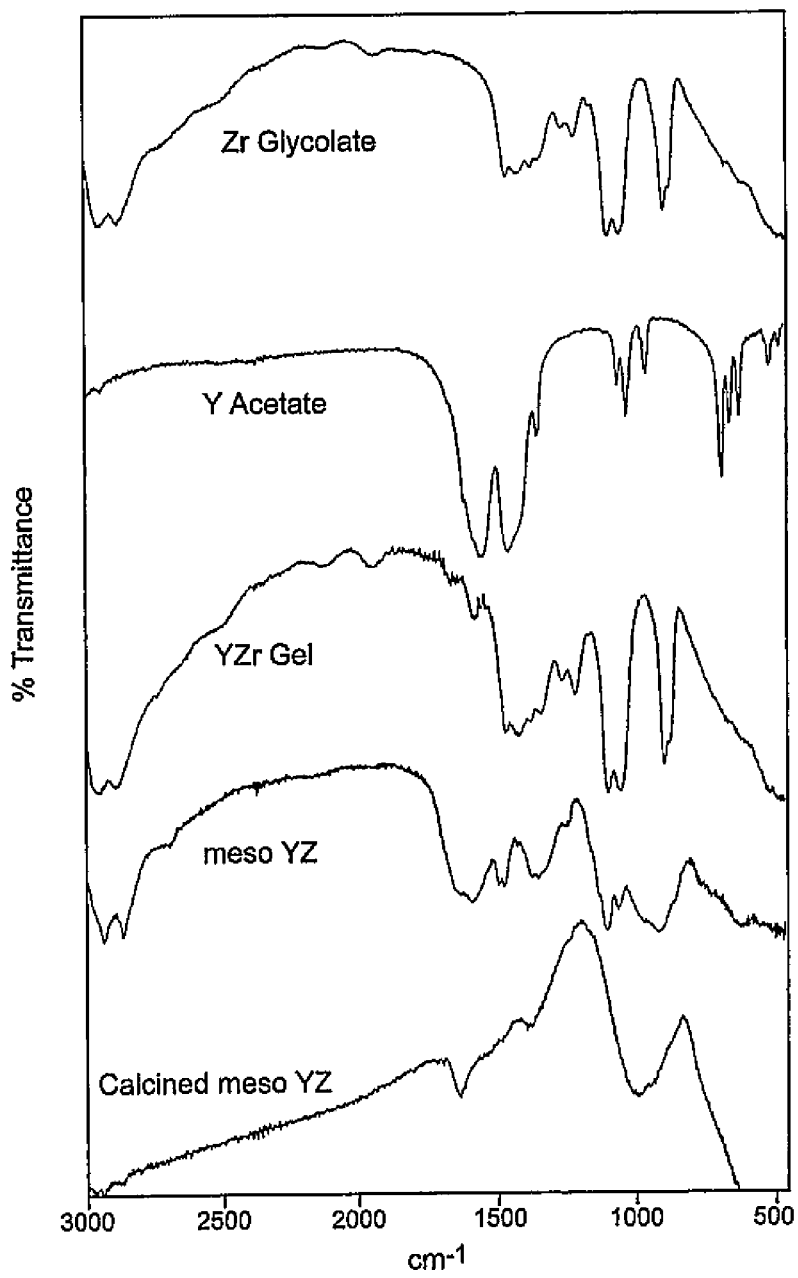
Figure 7A:
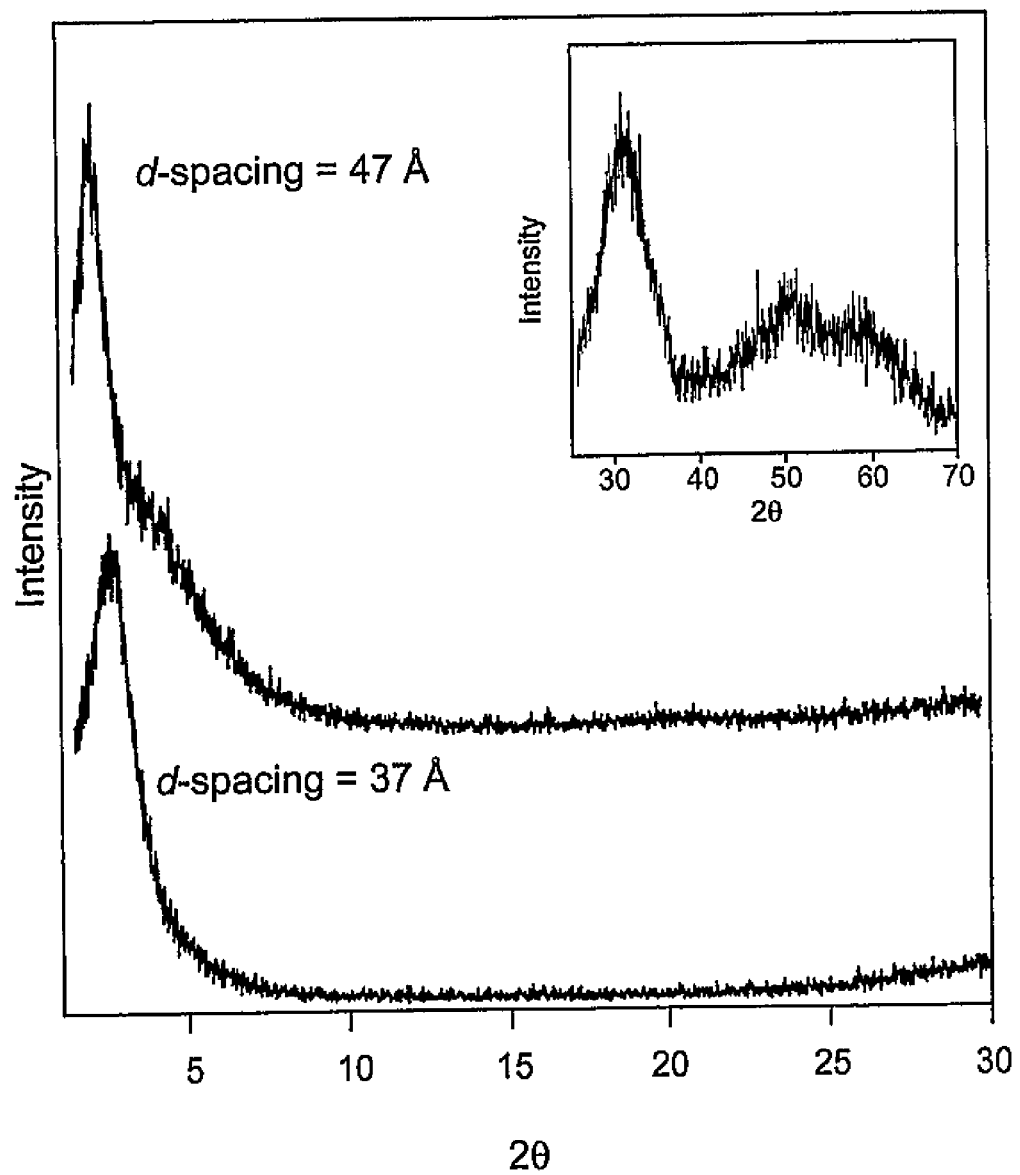
Figure 7B:
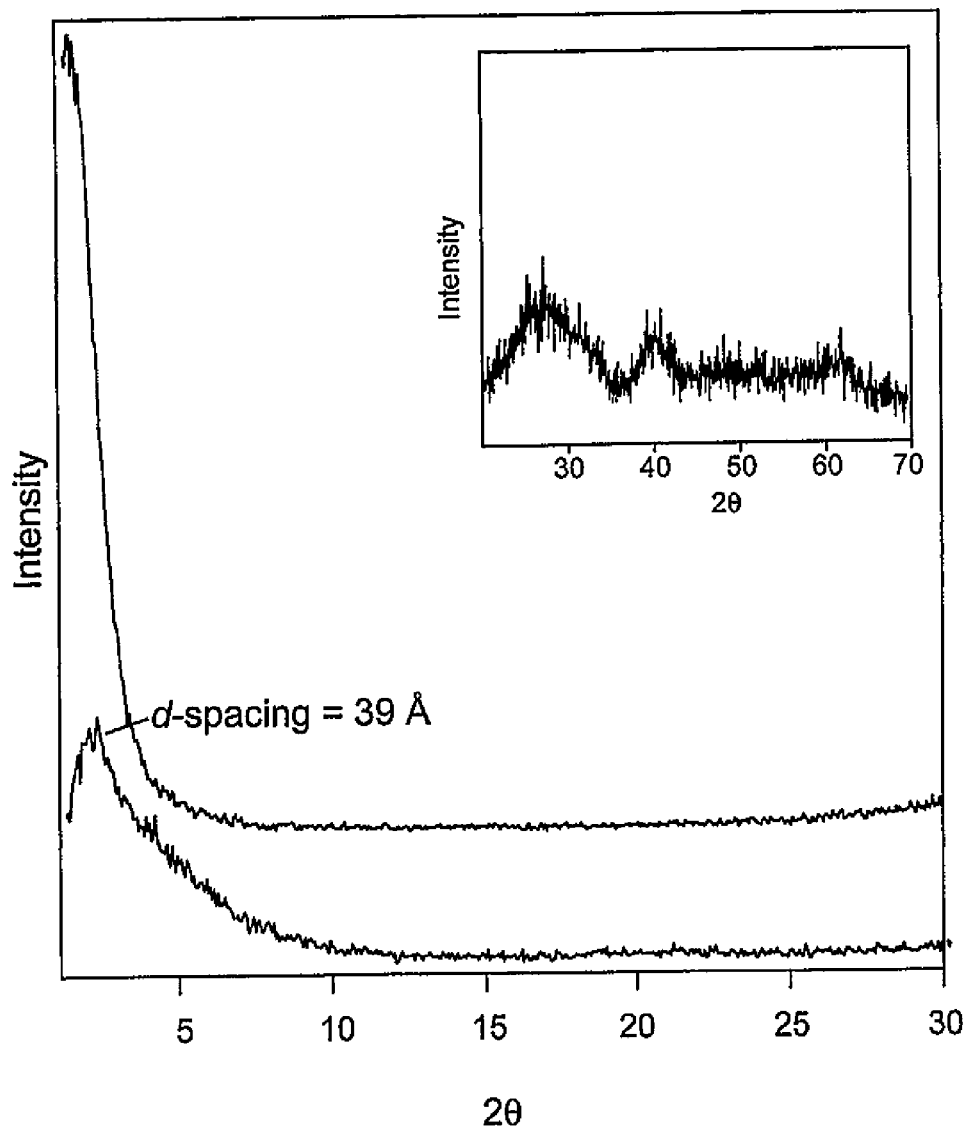
Figure 8:
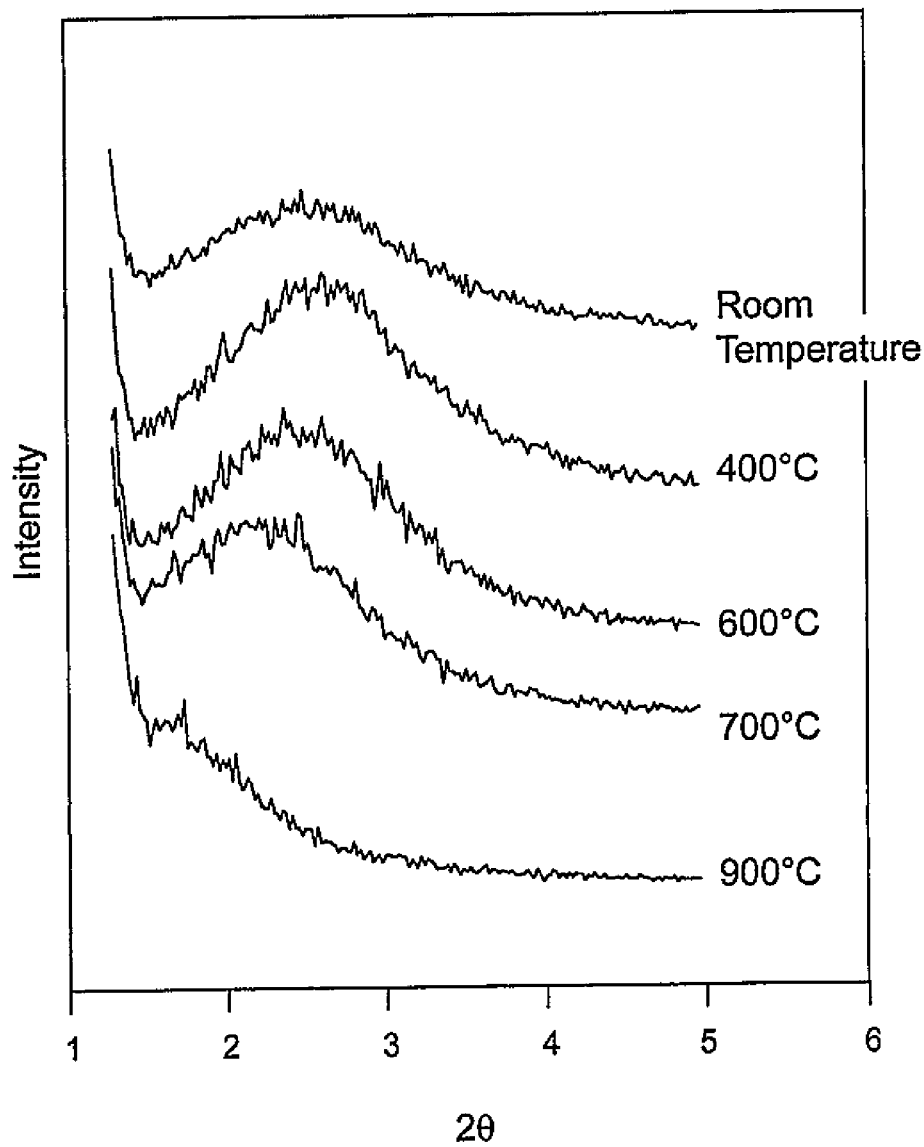
Figure 9A:
Figure 9B:
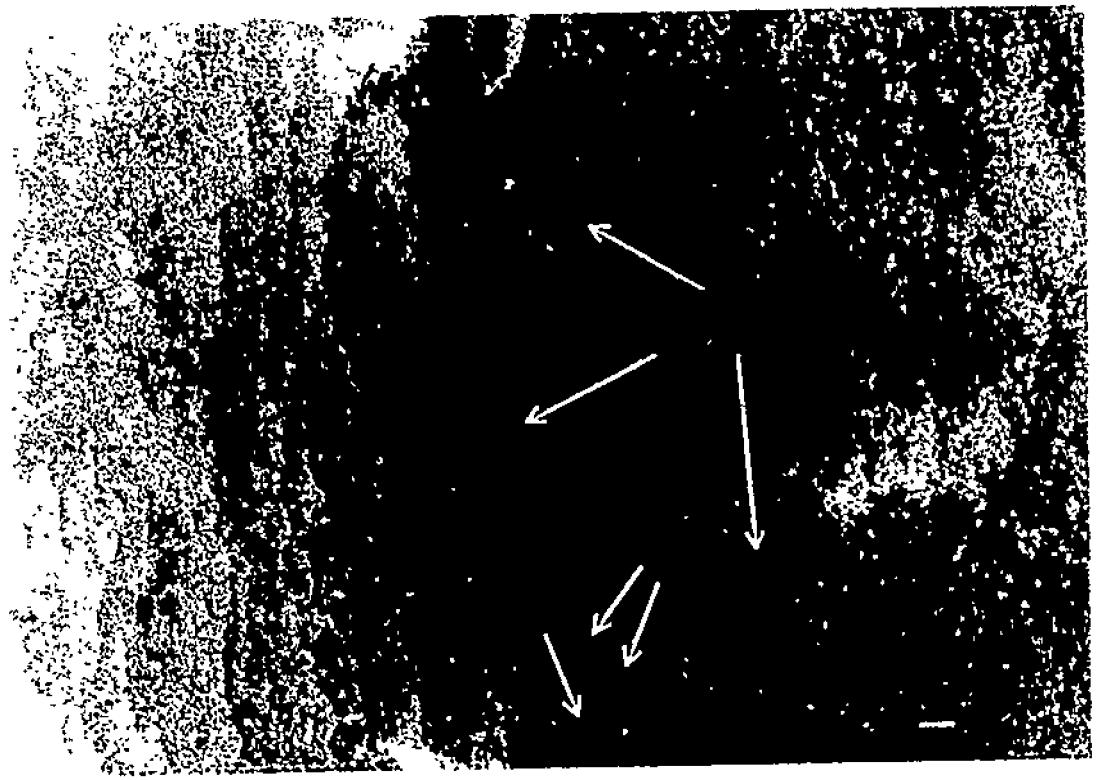

The synthesis of a homogeneous binary mesostructured metal oxide can be attrbuted to the formation of the YZ glycolate gel as a precursor. Major solubility problems have previously plagued yttrium sol-gel chemistry as both the iso-propoxide and anhydrous acetate forms have limited solubility in alcohol. The higher dielectric constant and coordinating ability of solvents like ethylene glycol serves to break down the polymeric structure of the yttrium precursor into a useful soluble form to facilitate mesophase synthesis. Through monitoring with IR, the YZ glycolate shows the presence of both glycolate and acetate groups while establishing that the gel is unique chemical compound and not simply a physical mixture of the yttrium and zirconium glycolates, FIG. 6. The IR spectra also show that some acetate and glycolate groups are retained in the as-synthesized meso-YZ. Sharp bands in YSZ are seen between 900–1000 cm-1 and are indicative of asymmetric vZr-O and vY-O stretching modes. These modes are also observed in meso-YZ calcined at 450° C. but their line widths are noticeably wider. This may originate from phonon broadening due to the very small dimensions of the yttria-zirconia material contained within the channel wall or inhomogeneous line broadening due to a variety of yttrium and zirconium microenvironments in the channel walls. A micro-Roman spectroscopy study of the meso-YZ materials, with a spatial resolution of around 1 µm has revealed similarly broadened symmetric vZr-O and vY-O modes in the region of 500–600 $cm^{-1}$. Co-existing in the IR/IR spectra are bands in the region of 1500–1600 $cm^{-1}$, which are attributed to Y/Zr-OH hydroxyls contained in the channel wall of meso-YZ.

Meso-PtYZ and Meso-NiYZ. To demonstrate proof-of-concept of the self-assembly synthetic approach to mesoporous yttria-zirconia fuel cell materials of the present invention, ternary meso-MYZ materials have been synthesized by co-assembling platinum and nickel complexes with surfactant templated yttrium-zirconiuim gels. FIG. 7 shows PXRD patterns comparing the as-synthesized and calcined versions of both meso-MYZ materials. Calcined meso-PtYZ compares well to binary meso-YZ in maintaining a narrow low-angle reflection with similar intensity as the as-synthesized material. In comparison, the as-synthesized meso-NiYZ material gives a much broader low-angle peak than the binary form, suggesting that it is not as well ordered as meso-YZ. Upon calcination, this low-angle reflection grows in intensity and shifts to a much higher d-spacing, on the border of the lower 2θ limit of the diffractometer, which prevents gauging the precise line width of the reflection. Both meso-MYZ materials exhibit reflections at higher 2θ, which correspond to nanocrystalline phases.

Figure 8:
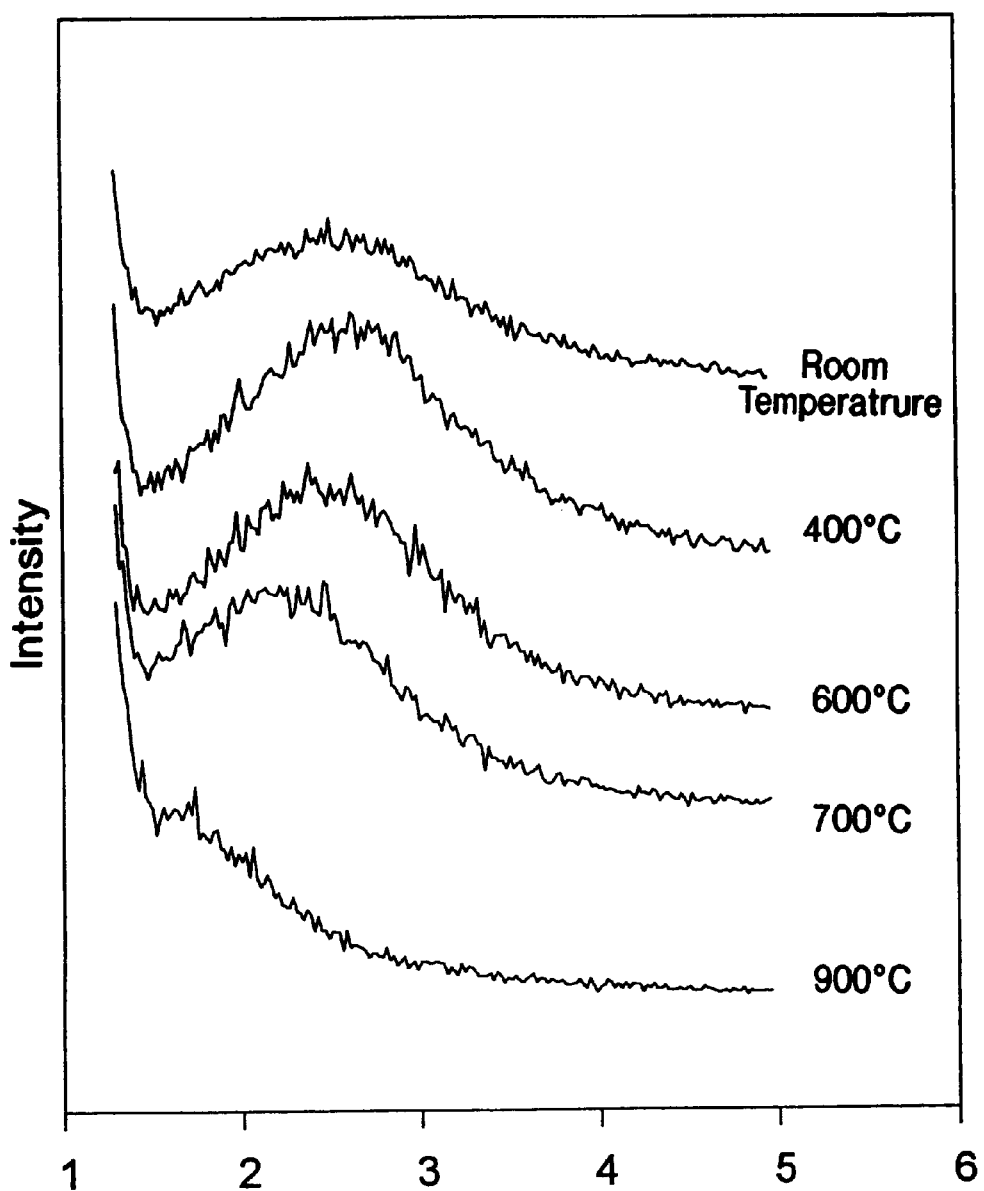
FIG. 8 is a graph of in-situ VT-PXRD of meso-PtYZ from room temperature 900° C. in air.

Meso-PtYZ calcined at 400° C. has been examined using in-situ VT PXRD to probe its thermal and structural stability, FIG. 8. Upon heating to 400° C., the low-angle reflection shifts to slightly lower d-spacing and grows in intensity implying the formation of a better ordered material with a smaller unit cell. As the temperature increases above 400° C., the low-angle reflection gradually shifts back to higher d-spacing corresponding to the formation of a larger unit cell possibly due to a thickening of the nanocrystalline walls. It is only between 800–900 ° C. where the intensity of the low-angle reflection gradually fades. In contrast, the accompanying reflections in the high-angle region of meso-PtYZ gradually grow in intensity and sharpen with an increase in time and temperature.

Figure 9:
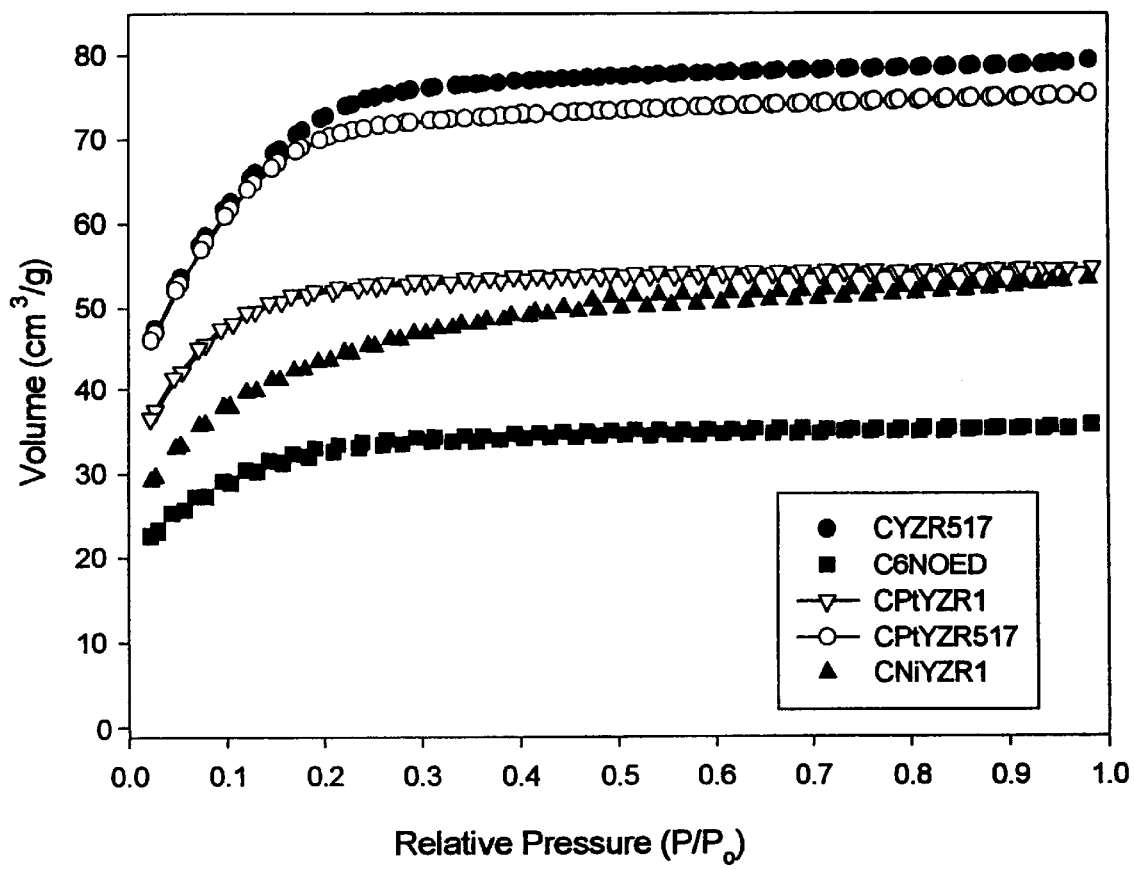
FIG. 9 is TEM images of microtomed sections of (top): calcined meso-PtYZ. Magnification bar=500 Å and (bottom): meso-NiYZ. Magnification bar=575 Å.

TEM images of calcined meso-PtYZ and meso-NiYZ depicted in FIG. 9 reveal clusters that reside within a mesostructure similar in appearance to the binary meso-YZ form. The meso-NiYZ material is more disordered than the platinum form, which further supports the PXRD analysis. The TEM image of meso-PtYZ shows distinctive Pt clusters on the order of 40 Å embedded within a porous network. HR-FE-TEM EDX spot analysis confirms that Pt resides only within these metallic clusters.

Figure 10:
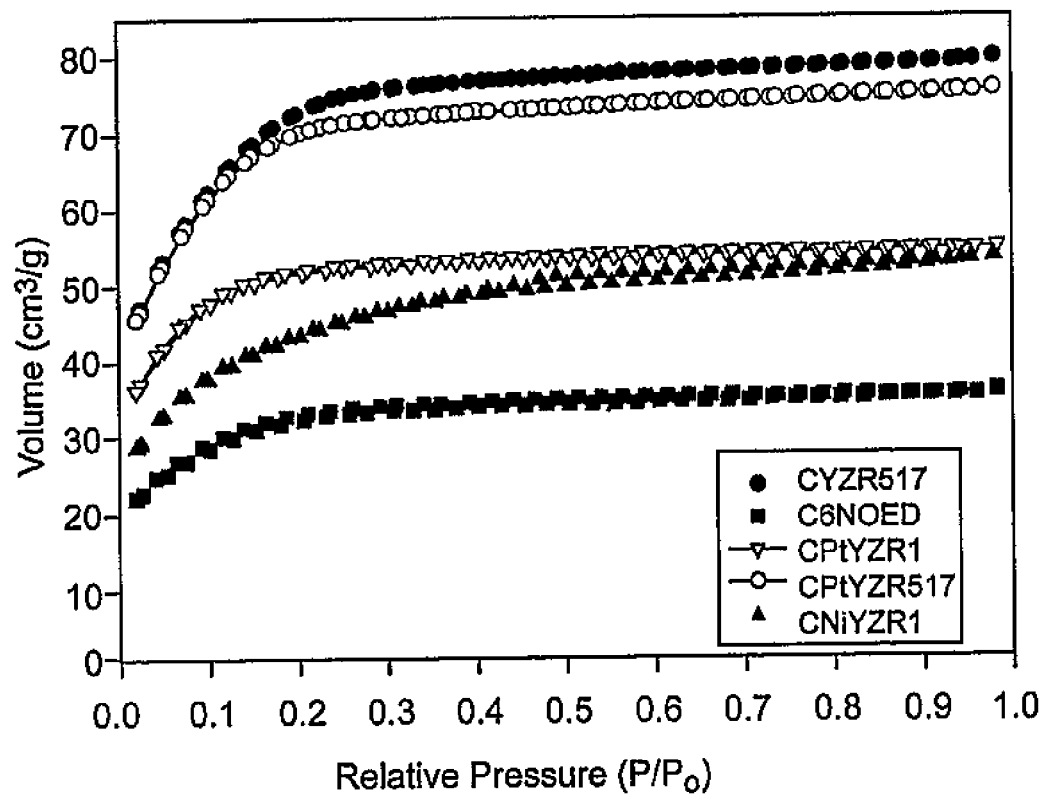
FIG. 10 is a graph of representative Type I, 77K nitrogen gas adsorption isotherm of meso-(M)YZ materials.

Nitrogen adsorption isotherms have been recorded for meso-YZ, meso-PtYZ and meso-NiYZ, which were calcined at various rates and temperatures in air. Unexpectedly, all samples yielded Type I isotherms with negligible hysteresis, which indicates the presence of microporosity (IUPAC convention, pore diameter <20Å) rather than the expected mesoporosity (pore diameter 20–500 Å), FIG. 10. Each material yielded an average micropore diameter of 18–21 Å, which borders the microporous and mesoporous regimes. Additionally, all samples conformed to the Langmuir surface area expression for monolayer coverage yielding linear ln P versus $P_o/P$ plots. During the calcination process, thickening of the channel walls of the mesostructure can occur to around 25–28Å, as determined from the combined PXRD/TEM/adsorption results. This may originate from the loss of acetate/glycol groups above 300° C. and concurrent condensation-polymerization of Y/Zr—OH groups to form Zr—O—Zr or Y—O—Zr bonds and a re-constructive transformation of the channel walls of the mesostructure to nc-YSZ as seen by VT PXRD and FE-HR-TEM lattice imaging. Table 1 gives a summary of results for a series of samples in which several trends can be observed. First, the incorporation of low loadings of Pt in meso-YZ has a negligible effect upon the overall surface area and pore diameter. Additionally, surface area tends to decrease at higher calcination temperatures and longer heating periods while the average pore diameter remains fairly constant. The plateau of the adsorption isotherm at high $P/P_o$ remains level with no upturn at highest partial pressures. This is indicative of wholly microporous samples and precludes the presence of either non-porous material or texturally porous material intermixed with microporous meso-MYZ.

Figure 11:
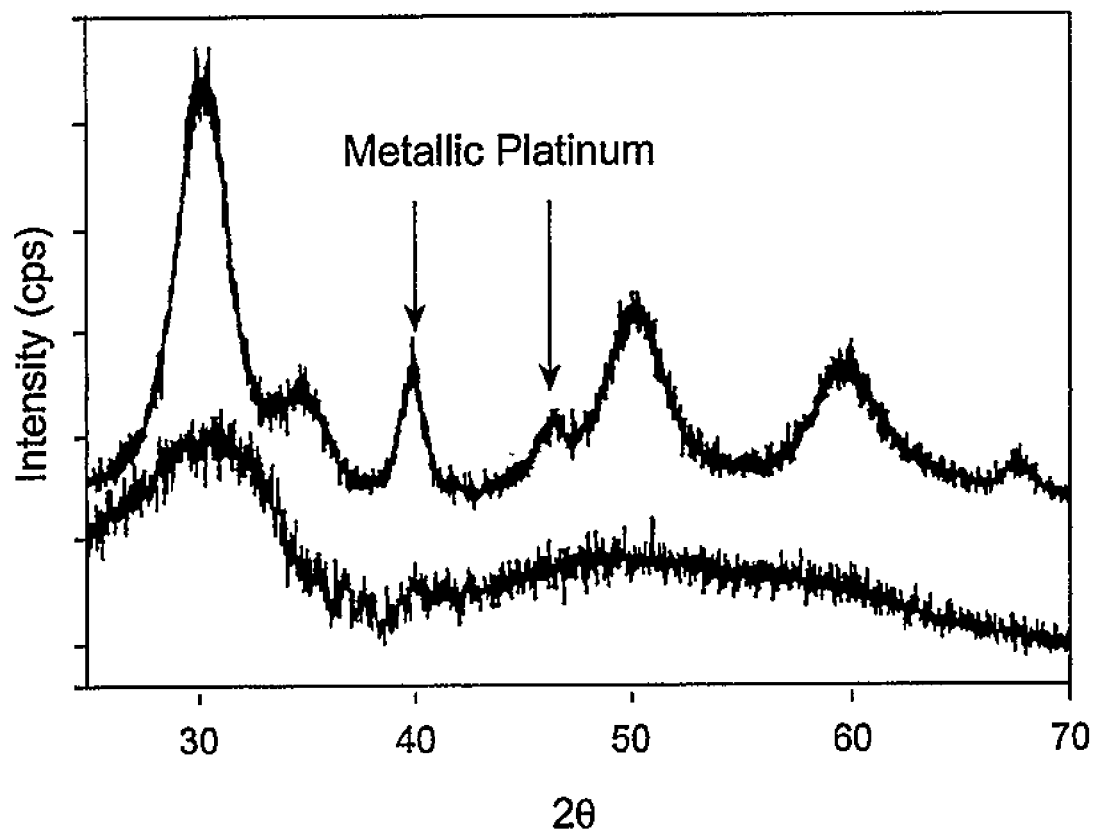
FIG. 11 is a graph of PXRD of meso-PtYZ (Top): calcined to 600° C. The unlabeled peaks are due to cubic YSZ. (Bottom): as-synthesized.
Figure 12:
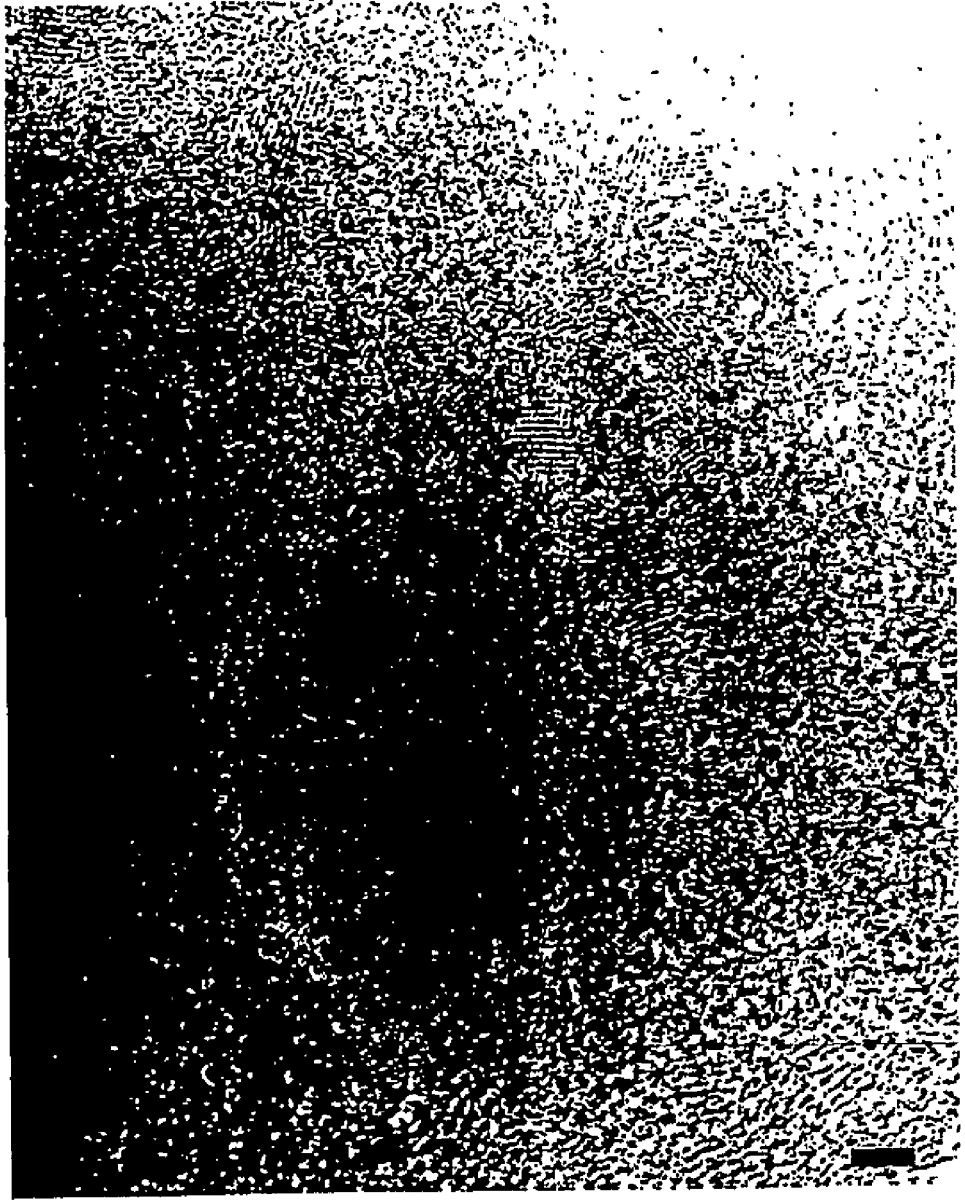
FIG. 12 is a HR-FE-TEM lattice image of calcined meso-PtYZ. A Pt cluster (darker color circle) is located just off center. Magnification bar=30 Å.

The nature of the nanocrystalline walls in meso-PtYZ was further examined through PXRD and TEM. PXRD patterns shown in FIG. 11 compare the higher angle region of the as-synthesized material, which shows mainly amorphous channel wall material, with the calcined material (600°C.) which becomes nanocystalline. Upon further examination, these reflections of the nanocrystilline wall material match well with cubic YSZ (JCPDS #30–1468) and metallic platinum (JCPDS #01–1194). By applying the Scherrer equation to diagnostic peaks for each compound, the particle size was estimated to give the following values: Cubic YSZ-111 peak: 35 Å, 220 peak 29 Å; Metallic Pt-111 peak: 69 Å, 200 peak; 58 Å. A HR-FE-TEM lattice image of a meso-PtYZ thin section in FIG. 12, gives unequivocal evidence for crystalline Pt clusters within a mesostuctured matrix of crystalline YSZ walls. Furthermore, the nc-YSZ domains are on the order of 30 Å, which supports the PXRD/gas adsorption estimate for channel wall thickness as well as the particle size estimation from the Scherrer equation. The Pt cluster in the image is also on the order of 30 Å.

Figure 13:
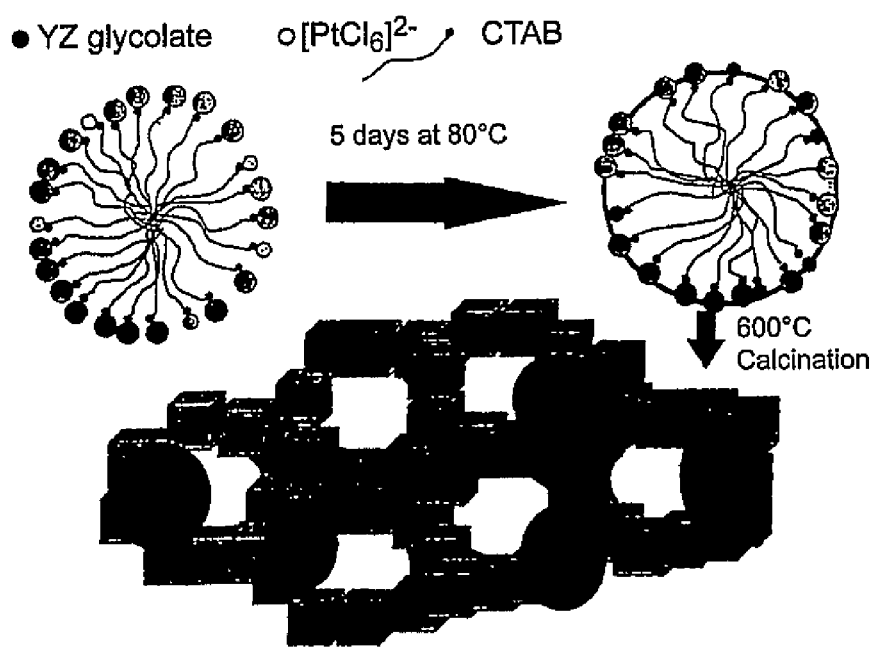
FIG. 13 is a graphical representation of one of the preferred embodiments of the invention.

X-ray photoelectron spectroscopy (XPS) establishes the presence of zero valent Pt(0) in both the as-synthesized and calcined materials. The Pt (IV) precursor complex is reduced over a period of 3 to 4 hours, perhaps after the $PtCl_{6-2}$ species co-assembles with the cationic surfactant cetyltrinethylammonium bromide, CTAB, and the YZ glycolate species to form meso-PtYZ as illustrated in FIG. 13. Elemental analysis (AAS) and XPS corroborate the expected elemental composition of meso-PtYZ as evident from Table 2. Both bulk and surface analytical techniques give similar values, demonstrating that meso-PtYZ has compositional homogeneity throughout the sample.

Table 1. Summary of Nitrogen Adsorption Isotherm Data for meso-(M)YZ.

TABLE 1

Summary of Nitrogen Adsorption Isotherm Data for meso-(M)YZ.

| Sample Notation | Thermal Post-Treatment | Multi-Point BET, $m^2/g$ | Langmuir SA, $m^2/g$ | Average Pore Diameter, Å | Micro Pore Volume, mL/g |
|---|---|---|---|---|---|
| meso-YZ1 (20% Y) | 6 hr ramp to 450° C. | 264 | 353 | 18.6 | 0.12 |
| meso-PtYZ1 (20% Y) | 6 hr ramp to 450° C. | 253 | 333 | 18.4 | 0.11 |
| meso-PtYZ2 (20% Y) | 12 hr ramp to 600° C., held for 3 hrs | 184 | 241 | 18.4 | 0.08 |
| meso-YZ2 (56% Y) | 12 hr ramp to 600° C., held for 3 hrs | 116 | 158 | 19.2 | 0.05 |
| meso-NiYZ (20% Y) | 6 hr ramp to 450° C. | 156 | 240 | 21.2 | 0.07 |

TABLE 2

Summary of Elemental Analysis Data for meso-PtYZ.

| | Pt % | Y % | Zr % |
|---|---|---|---|
| Expected | 1–2 | 19.7 | 80.3 |
| XPS | 1.6 | 18.3 | 81.7 |
| Elemental Analysis | 1.1 | 19.9 | 80.1 |

We claim:

1. A thermally stable solid oxide fuel cell electrode material which comprises a metal-stabilized-zirconia wherein surface area of said material is from about 150 $m^2/g$ to about 500 $m^2/g$.; and wherein said material has uniform pore sizes from about 10 Å to about 30 Å; and wherein said metal is compatible with said zirconia.

2. A thermally stable solid oxide fuel cell electrode material according to claim 1 wherein said compatible metal is selected from the group consisting of alkaline earth metals and transition metals.

3. A thermally stable solid oxide fuel cell electrode material according to claim 2 wherein said compatible metal is yttria.

4. A thermally stable solid oxide fuel cell electrode material according to claim 3 wherein said electrode material comprises from about 10 to about 60 atomic percentage yttria.

5. A thermally stable solid oxide fuel cell electrode material according to claim 2 which further comprises a third metal; wherein said third metal is a transition metal; and wherein said third metal is soluble with said metal-stabilized zirconia.

6. A thermally stable solid oxide fuel cell electrode material according to claim 5 wherein said third metal is selected from the group consisting of titanium and niobium.

7. A thermally stable solid oxide fuel cell electrode material according to claim 2 which further comprises a third metal; wherein said third metal is incorporated as nanoclusters; and wherein said nanoclusters are uniformly dispersed throughout said solid oxide fuel cell electrode material; and wherein said third metal is a transition metal.

8. A solid oxide fuel cell electrode material according to claim 7 wherein said third metal is selected from the group consisting of platinum, nickel, palladium, copper, iron, ruthenium, rhodium and cobalt.

* * * * *

UNITED STATES PATENT AND TRADEMARK OFFICE
CERTIFICATE OF CORRECTION

| | | |
|---|---|---|
| PATENT NO. | : 6,420,063 B1 | Page 1 of 17 |
| APPLICATION NO. | : 09/496386 | |
| DATED | : July 16, 2002 | |
| INVENTOR(S) | : Ozin et al. | |

It is certified that error appears in the above-identified patent and that said Letters Patent is hereby corrected as shown below:

Please delete old drawings and replace these new drawings pages 1of 16.

Signed and Sealed this

Second Day of January, 2007

JON W. DUDAS
*Director of the United States Patent and Trademark Office*